United States Patent
Mech et al.

(10) Patent No.: US 11,138,776 B2
(45) Date of Patent: Oct. 5, 2021

(54) ADAPTIVE IMAGE ARMATURES WITH INTERACTIVE COMPOSITION GUIDANCE

(71) Applicant: ADOBE INC., San Jose, CA (US)

(72) Inventors: Radomir Mech, Mountain View, CA (US); Jose Ignacio Echevarria Vallespi, San Jose, CA (US); Jingwan Lu, Santa Clara, CA (US); Jianming Zhang, Campbell, CA (US); Jane Little E, Redwood City, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/416,123

(22) Filed: May 17, 2019

(65) Prior Publication Data

US 2020/0364914 A1    Nov. 19, 2020

(51) Int. Cl.
| | |
|---|---|
| *G06T 11/60* | (2006.01) |
| *G06T 7/70* | (2017.01) |
| *G06T 7/33* | (2017.01) |
| *G06T 7/32* | (2017.01) |
| *G06T 7/00* | (2017.01) |
| *H04N 5/232* | (2006.01) |

(52) U.S. Cl.
CPC ............ *G06T 11/60* (2013.01); *G06T 7/0002* (2013.01); *G06T 7/32* (2017.01); *G06T 7/344* (2017.01); *G06T 7/70* (2017.01); *G06T 7/97* (2017.01); *G06T 2200/24* (2013.01); *G06T 2207/20092* (2013.01); *G06T 2207/30168* (2013.01); *H04N 5/23222* (2013.01); *H04N 5/232945* (2018.08)

(58) Field of Classification Search
None
See application file for complete search history.

(56) References Cited

U.S. PATENT DOCUMENTS

| | | | | |
|---|---|---|---|---|
| 10,110,868 | B2* | 10/2018 | Hariri | ............. H04N 5/232939 |
| 2009/0278958 | A1* | 11/2009 | Bregman-Amitai | ........................ H04N 5/23219 348/231.99 |

(Continued)

OTHER PUBLICATIONS

Amirshahi et al. "Evaluating the Rule of Thirds in Photograohs and Paintings", Nov. 2013 (Year: 2013).*

(Continued)

*Primary Examiner* — Hilina K Demeter
(74) *Attorney, Agent, or Firm* — Shook, Hardy & Bacon L.L.P.

(57) ABSTRACT

Various methods and systems are provided for image-management operations that includes generating adaptive image armatures based on an alignment between composition lines of a reference armature and a position of an object in an image. In operation, a reference armature for an image is accessed. The reference armature includes a plurality of composition lines that define a frame of reference for image composition. An alignment map is determined using the reference armature. The alignment map includes alignment information that indicates alignment between the composition lines of the reference armature and the position of the object in the image. Based on the alignment map, an adaptive image armature is determined. The adaptive image armature includes a subset of the composition lines of the reference armature. The adaptive image armature is displayed.

20 Claims, 12 Drawing Sheets

(56) References Cited

U.S. PATENT DOCUMENTS

| | | | |
|---|---|---|---|
| 2013/0188866 A1* | 7/2013 | Obrador | G06K 9/00664 382/165 |
| 2013/0258159 A1* | 10/2013 | Sakane | H04N 5/23219 348/333.02 |
| 2014/0029843 A1* | 1/2014 | Obrador Espinosa | G06K 9/036 382/165 |
| 2015/0098000 A1* | 4/2015 | Gosangi | G06T 11/60 348/333.02 |
| 2016/0117834 A1* | 4/2016 | Wang | G06T 7/13 382/173 |

OTHER PUBLICATIONS

Amirshahi et al. "Evaluating the Rule of Thirds in Photographs and Paintings" (Year: 2013).*

Chen, Y. L., Klopp, J., Sun, M., Chien, S. Y., & Ma, K. L. (2017). Learning to Compose with Professional Photographs on the Web. arXiv preprint arXiv:1702.00503.

Farhat, Farshid, Mohammad Mandi Kamani, Sahil Mishra, and James Z. Wang. "Intelligent portrait composition assistance: Integrating deep-learned models and photography idea retrieval." In Proceedings of the on Thematic Workshops of ACM Multimedia 2017, pp. 17-25. ACM, 2017.

He, Sigiong, et al. "Discovering triangles in portraits for supporting photographic creation." IEEE Transactions on Multimedia 20.2 (2018): 496-508.

Lee, Jun-Tae, et al. "Photographic Composition Classification and Dominant Geometric Element Detection for Outdoor Scenes." Journal of Visual Communication and Image Representation (2018).

Ma, Shuang, Yangyu Fan, and Chang Wen Chen. "Finding your spot: A photography suggestion system for placing human in the scene." Image Processing (ICIP), 2014 IEEE International Conference on. IEEE, 2014.

Mitarai, Hiroko, Yoshihiro Itamiya, and Atsuo Yoshitaka. "Interactive photographic shooting assistance based on composition and saliency." International Conference on Computational Science and Its Applications. Springer, Berlin, Heidelberg, 2013.

Rawat, Yogesh Singh, and Mohan S. Kankanhalli. "Context-aware photography learning for smart mobile devices." ACM Transactions on Multimedia Computing, Communications, and Applications (TOMM) 12.1s (2015): 19.

Wang, Yinting, et al. "Where2stand: A human position recommendation system for souvenir photography." ACM Transactions on Intelligent Systems and Technology (TIST)7.1 (2015): 9.

Wei, Zijun, et al. "Good View Hunting: Learning Photo Composition from Dense View Pairs." Proceedings of the IEEE Conference on Computer Vision and Pattern Recognition. 2018.

Xu, Pengfei, et al. "Where should I stand? Learning based human position recommendation for mobile photographing." Multimedia tools and applications 69.1 (2014): 3-29.

Zhang, Xiaodan, et al. "Dominant Vanishing Point Detection in the Wild with Application in Composition Analysis." Neurocomputing (2018).

Zhou, Zihan, Farshid Farhat, and James Z. Wang. "Detecting dominant vanishing points in natural scenes with application to composition-sensitive image retrieval." IEEE Transactions on Multimedia 19.12 (2017): 2651-2665.

* cited by examiner

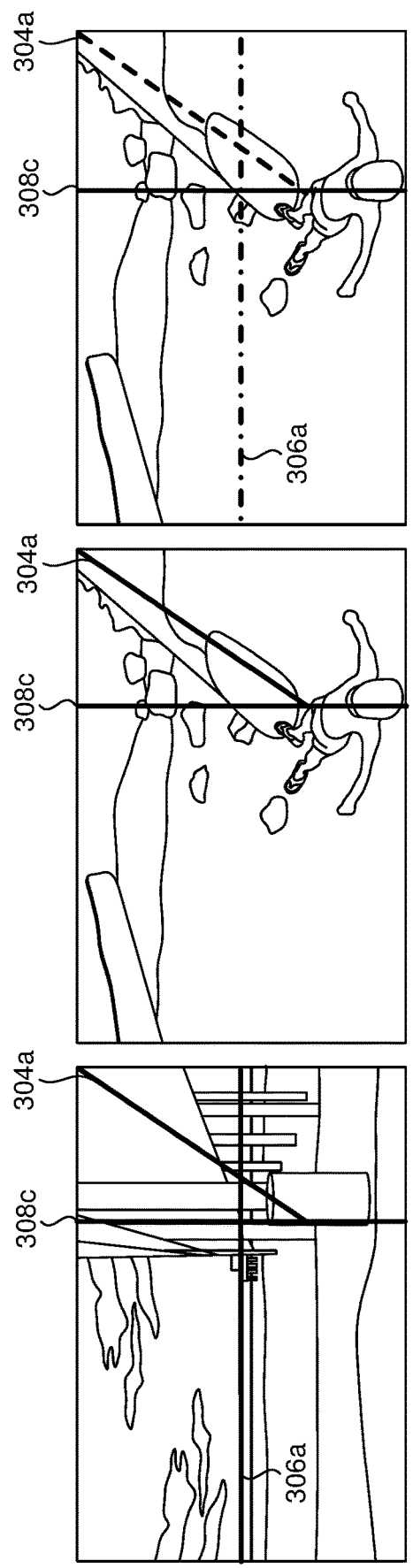

ADAPTIVE IMAGE ARMATURES WITH INTERACTIVE COMPOSITION GUIDANCE

BACKGROUND

Oftentimes, users desire to capture images of scenes or individuals arranged or composed in a specific manner. Image composition generally describes the placement objects in a work of art, such as an image. For example, in photography, composition is a key consideration when attempting to create an aesthetically pleasing image, including when taking a picture or editing the picture later. Users often rely on well-known static composition templates (e.g., rule of thirds) to both compose and improve the aesthetic quality of photographs (when taking photographs or when editing photographs after they have been taken). Some conventional image-management systems (i.e., image capture devices and image editing applications) have incorporated static composition templates into workflows to assist users in image composition. However, even with such workflows, composition features in image-management systems are often static and lack interactive features for image composition.

SUMMARY

Embodiments of the present disclosure relate to computer storage media, methods, and systems for automatically generating image armatures (e.g., adaptive image armatures) for content in the image by adapting or identifying a subset of composition lines from a reference composition armature template (e.g., reference armature). In particular, while shooting an image or editing an image, a subset of composition lines can be dynamically identified from the total set of composition lines of the reference armature because they are determined to be the most compositionally relevant in the image. In addition, the subset of composition lines may be used to guide the user in composing an image (i.e., provide visual guidance using interface elements, instructions, and feedback for image composition).

In operation, during in-camera image capturing operations, an image is accessed. A position of an object in the image is identified. A reference armature (e.g., a harmonic armature), for the image, is accessed. The reference armature includes a plurality of composition lines that are referenced for composing image (i.e., define a frame of reference for image composition). An alignment map is determined using the reference armature. The alignment map includes alignment information indicating an alignment between the composition lines of the reference armature and the position of the object in the image. Based on the alignment map, an adaptive image armature is determined (i.e., a subset of composition are selected from the reference armature). In this way, the adaptive image armature includes a subset of the composition lines of the reference armature. In particular, the adaptive image armature is a modified reference armature that includes the subset of composition lines identified based on the alignment map of the composition lines and the reference armature. The adaptive image armature is displayed on the image, where the subset of composition lines is provided on an interface (e.g., camera or image software) overlaid of the image that the user is composing. The same or different adaptive image armatures can be dynamically displayed when the object is accessed in a plurality of subsequent positions (e.g., a user moving a camera to capture the object in different positions), where adaptive image armatures are dynamically determined for the corresponding plurality of subsequent positions of the object.

As such, embodiments described herein override the routine and conventional image-management operations ordinarily triggered for composing images, in order to improve image-management operations in image-management systems. The inventive operations further result in efficiency in user navigation of graphical user interfaces, and user identification of compositions or composition-styles through efficient searching.

This Summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached drawing figures, wherein:

FIGS. 6a-6c are schematic diagrams showing exemplary user interfaces illustrating an adaptive image armature including visual guidance, in accordance with embodiments of the present disclosure;

DETAILED DESCRIPTION

Overview

Figure 1:
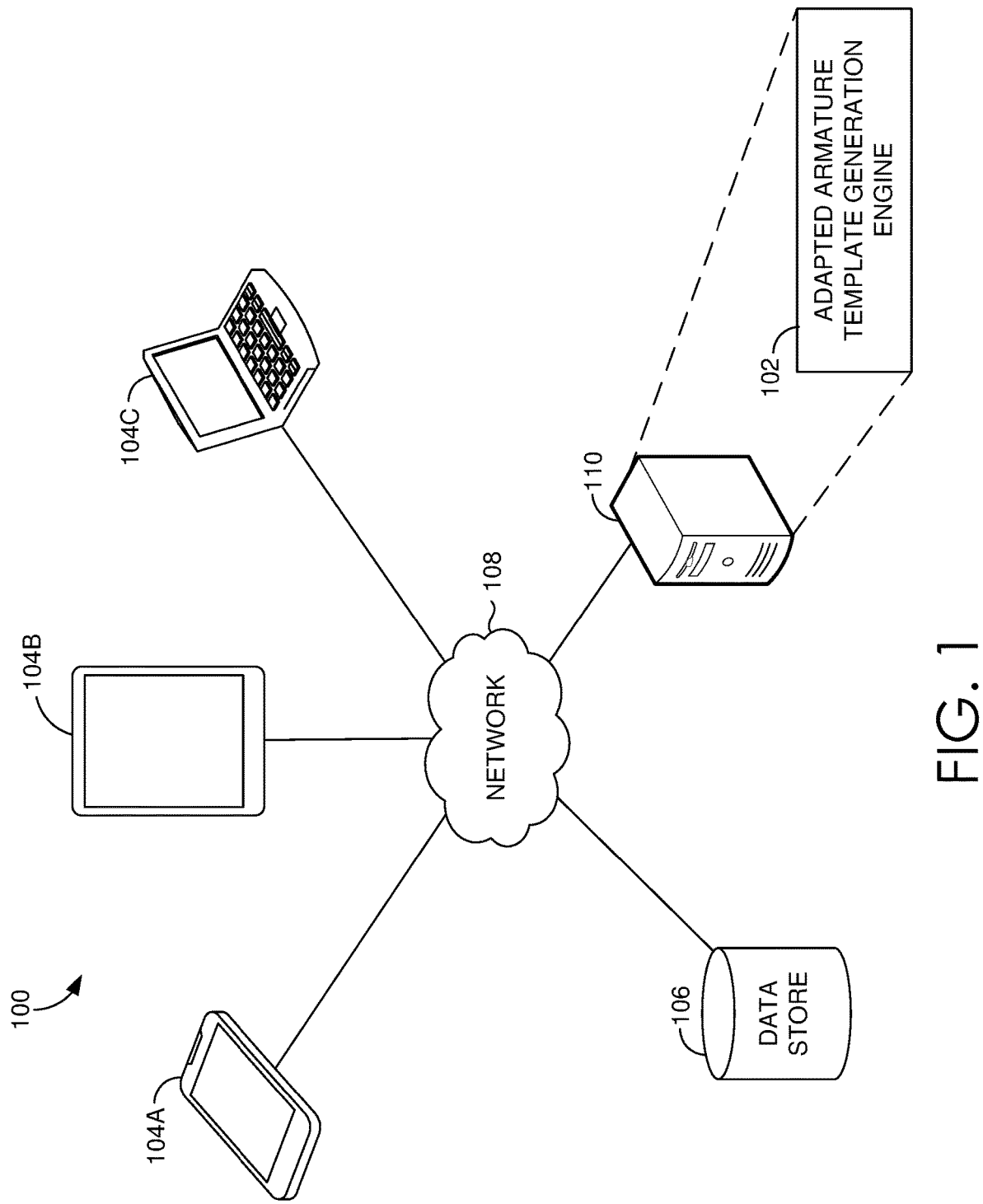
FIG. 1 is a schematic depiction of an adaptive image armature generation system for generating adaptive image armatures, in accordance with embodiments of the present disclosure.

Oftentimes, users desire to capture images of scenes or people, arranged or composed in a specific manner, using image-management systems. In other cases, users desire to be made aware of what composition options exist, when editing a captured image, to improve the aesthetics of that image. Generally, composition, that is, how objects and other visually important elements are arranged (e.g., positioned) within an image, plays a major role in the overall aesthetic quality of an image. There exist many different composition techniques (i.e., composition templates, frame within frame, patterns and textures, rule of odds, etc.) on which users (e.g., photographers) rely to help compose images. For example, composition templates include the rule-of-thirds, golden triangles, centered composition and symmetry templates, leading lines, and harmonic reference templates.

Each composition template generally includes a set of composition lines and composition line intersection points. A composition template assists in positioning (e.g., placing, aligning, orienting) objects within the image along the composition lines and at the intersection points of the composition template such that there exists an increased likelihood that a well-composed and aesthetically pleasing image can be captured. For example, the rule-of-thirds template uses a set of composition lines to divide an image into nine equal rectangles resulting in a three-rectangle-across by three-rectangle-down image. Positioning objects within that image either along or at the intersection of the composition lines of the rule-of-third static template provides a compositional image that is associated with the rule of thirds.

Image-management systems (e.g., image capture devices, such as cameras, and/or image editing applications, such as photography applications) utilize composition templates in a variety of situations, including during image-capturing operations and image-editing operations. In particular, a user can utilize a composition template (e.g., static composition template) to capture an image (image-capturing operations), when the user typically has the most degrees of freedom to position (e.g., align) the objects of an image. Further, a user can utilize a composition template during image-editing operations by adjusting (e.g., crop, rotate) the image in an attempt to position objects within the image along the composition lines of a static composition template. For example, a photographer conducting a photoshoot may want the objects in the photo to align with the rule-of-thirds composition template. During the photoshoot, the photographer can position the objects in the image in an attempt to align them with the composition lines of the rule-of-thirds armature. In some cases, however, a user may be unaware (e.g., lack an understanding) of which objects (e.g., most important and/or relevant features) in the image to reposition to create a more well-composed image.

Current image-management systems include processes for improving image quality based on image composition. For example, a photographer may wish to take a photograph of a field of trees. During image-capturing operations, this prior technique enables the photographer to display a composition template over the field of trees while taking the photograph. The static composition template will remain static regardless of any change in position of the trees in the image.

Similarly, if the photographer wishes to adjust the field of trees photograph during image-editing operations, this prior technique enables the photographer to display a static composition template over the image in an attempt to assist the photographer in achieving a well-composed image. The static composition template will remain static regardless of any change in position of the trees in the image (e.g., via image editing). While this prior technique may be suitable for users knowledgeable about image composition or who wish to display the same static composition template over each image during image-capturing operations and image-editing operations, it might not be as helpful for amateur users who lack an understanding of the relationships between objects depicted in an image and the lines of the static composition template and, as such, desire visual guidance (e.g., interactive learning).

In another prior technique, a composition template that most closely matches an image is detected using an algorithm and is superimposed upon the image for a user to see. The interface in this prior technique enables the user to modify the image to achieve only the detected, superimposed static composition template. While this practice may be suitable for aiding a user in achieving a better-composed image, it constrains the freedom of the user by both enforcing the detected static composition template onto the image and excluding user participation from the detection process.

Additionally, conventional image-management systems currently support suggesting crops of an image to a user based on the learned aesthetic preferences of the user using mechanical turkers (e.g., human-assisted artificial intelligence). Essentially, the mechanical turkers compare pairs of image crops of an original image and, based on the learned aesthetic preferences, select which image (or set of images) is more aesthetically pleasing to present to the user (e.g., is well-composed). While this practice may be suitable for situations in which the user merely wants to make a selection from among different image crops, it presents issues. For example, the technique does not account for image composition during the image-capturing operations, nor does it provide feedback to the user about why one crop may be better than the other. As such, a comprehensive image-management system that addresses at least the above-described challenges would improve image composition operations and interfaces using image-management systems.

As such, embodiments of the present invention include simple and efficient methods, systems, and computer storage media for improving image-management systems using adaptive image armatures. In this regard, image armatures, that is, a subset of composition lines selected from a reference armature are dynamically identified for objects in an image. In particular, while shooting an image or editing an image, a subset of composition lines can be identified because they are determined to be the most compositionally relevant in the image. In addition, the subset of composition lines may be used as visual guidance that provide interface elements for image composition instructions and feedback to a user.

Image-management systems are improved based on generating adaptive image armatures for images from a reference armature (e.g., a harmonic armature). In particular, an adaptive image armature generation engine supports automatically generating the adaptive image armatures by adapting or identifying (e.g., dynamically and adaptively while shooting the image or editing the image) a subset of composition lines from the reference armature. The subset of composition lines is determined to be most compositionally relevant in an image based on an alignment between composition lines of a reference armature and the positon of an object in an image. In addition to generating adaptive image armatures for images, the adaptive image armature generation engine provides graphical user interfaces having visual guidance elements that are dynamically generated based on an adaptive image armature of an image.

This invention addresses the limitations in conventional image-management systems that do not dynamically adapt to particular scenes or provide insight on how to improve image composition in real-time. For example, prior techniques operationally display to the user all of the composition lines of the static composition template, rather than determining a subset of only the most relevant composition lines, leaving the image cluttered and difficult to understand. Further, prior techniques are unable to adapt in real-time to position changes of objects to subsequent positions during image capturing and/or image editing. Prior techniques are also incapable of providing feedback to the user (e.g. visual guidance) regarding how to make adjustments that result in a better-composed image.

In this regard, in accordance with embodiments described herein, adaptive image armature generation engine improves dynamic in-camera image capture operations, image-editing operations, and composition-identification operations based on the adaptive image armatures and visual guidance elements, which implicitly and explicitly support advancing users' understanding of image composition.

In operation, during in-camera image capturing operations, a reference armature for an image is accessed. The reference armature generally includes a plurality of composition lines that define a frame of reference for image composition. The reference armature can be used to determine an alignment map, which generally includes alignment information indicating an alignment between the composition lines of the reference armature and a position of the object in the image. Based on the alignment map, an adaptive image armature is determined that includes a subset of the composition lines of the reference armature. The adaptive image armature may be displayed on the image. As can be appreciated, the same or different adaptive image armature can be dynamically displayed as the object moves to subsequent positions in the image (e.g., a user moving a camera to capture the object in different positions).

In another embodiment described herein, a model armature template is used to determine that an image, such as an image in an image database, corresponds to the model armature template (i.e., via image-querying operations). At a high level, an image may conform to a particular style (e.g., either a rule-of-thirds reference armature or golden triangle reference armature), such that the style is identified as a model armature template. The model armature template may be selected by a user to identify another image whose composition conforms to the model armature template. As such, a composition of a first image may be used to identify other images having a similar composition.

In operation, during image-querying operations to identify images with similar compositions to a model armature template, a selection of the model armature template is received. The model armature template includes a model subset of composition lines associated with a reference armature. An image is accessed to determine whether the image's composition corresponds to the model armature template. A reference armature is accessed that can be used to determine an alignment map, which generally indicates alignment information between the plurality of composition lines of the reference armature and an identified position of an object in the image. Based on the alignment map, an adaptive image armature is determined, which includes a subset of composition lines of the reference armature. A determination is made whether the adaptive image armature of the image correlates with the model armature template. Based on the adaptive image armature correlating with the model armature template, a determination is made that the image corresponds with the model armature template. The adaptive image armature can be identified or displayed on the image.

In another embodiment described herein, a composition style including at least two model armature templates is used to determine whether an image, such as an image in an image database, corresponds to one of the model armature templates (i.e., via image-querying operations). At a high level, an image may conform to a particular style (e.g., either a rule-of-thirds reference armature or golden triangle reference armature), such that the style is identified as a model armature template. At least two model armature templates (i.e., a composition style) may be selected by a user to identify images whose composition conforms to either of the model armature templates. As such, a composition of a first and a second image may be used to identify other images having a similar composition.

In operation, during image-querying operations, a selection of a composition-style including at least two model armature templates may be received. Each model armature template of the composition-style includes a model subset of composition lines from a plurality of composition lines associated with a reference armature. An image is accessed to determine whether the image's composition corresponds to either of the at least two model armature templates. A reference armature is accessed that can be used to determine an alignment map for the image, which generally includes alignment information that indicates an alignment between the plurality of composition lines of the reference armature and an identified position of an object in the image. Based on the alignment map, an adaptive image armature is determined, which includes a subset of composition lines of the reference armature. A determination is made whether the adaptive image armature of the image correlates with either of the at least two model armature templates. Based on the adaptive image armature correlating with one of the at least two model armature templates, a determination is made that the image corresponds with one of the at least two model armature templates. The adaptive image armature can be identified or displayed on the image.

Visual guidance during image-management operations (i.e., image-capturing operations, image-editing operations, and image-querying operations) may be provided. During image-management operations, the adaptive image armature can be displayed with visual guidance for fitting the object to the adaptive image armature. The visual guidance may include instructions to the user on how to capture an image of the object based on the adaptive image armature. The visual guidance can be iteratively updated based on identifying changes in the position of the object to subsequent positions. During image-capturing operations, adjustments may include, for example, repositioning the object in the image, introducing a new object into the image, or changing the viewpoint from which the image is being captured. During image-editing operations, adjustments may include, for example, rotating and cropping the image. During image-querying operations, adjustments may include, for example, rotating and cropping the at least one image.

As such, embodiments described herein improve dynamic in-camera image capture operations, image-editing operations, and composition-identification operations, based on the adaptive image armatures and visual guidance elements. For example, the ordered combination of steps for determining an adaptive image armature for an image specify how operations on an image (using an alignment map having alignment information) are performed to yield the desired result of an adaptive image armature overlaid on an image along with composition visual guidance (e.g., composition feedback and control). The inventive operations further result in efficiency in user navigation of graphical user interfaces, and user identification of compositions or composition-styles through efficient searching. In this regard, the image-management operations facilitate generating better-composed images, while the visual guidance operations provide awareness of the compositional decisions a user can make based on alignment, thereby causing the user to be more intentional during image-capturing operations and image-editing operations.

Definitions

Having briefly described an overview of aspects of the present disclosure, various terms used throughout this description are provided. Although more details regarding various terms are provided throughout this description, general descriptions of some terms are included below to provide a clearer understanding of the ideas disclosed herein:

Composition—As used herein, the term "composition" refers to the position (e.g., placement, location, orientation, organization, layout) of objects in an image. Specifically, an image composition is defined by an alignment of visually important elements (e.g., objects) in the image with the composition lines and intersections points of a composition template. In photography, composition is a key consideration when attempting to create (e.g., photograph, edit) an aesthetically pleasing image. Composition is an important tool a user can control to guide a viewer toward the most important visual elements in an image. As the position of objects change within an image, the composition of that image can also change.

Depending on the situation, the methods in which the position of objects in an image can change, thereby changing the composition of the image, can vary. For example, during image-capturing operations, a photographer can either physically re-position the objects if the objects are moveable, or the photographer can reposition the point of view from which the image will be captured. In contrast, during image-editing operations and image-querying operations, a user's options are generally more limited. For example, the objects in the image are typically fixed, constraining editing the composition of the image to adjustments such as, for example, image rotation and image cropping.

Reference Armature—As used herein, the term "reference armature" refers to a set of composition lines that represent a frame of reference for image composition. In particular, the set of composition lines identify specific positions for objects in an image that, if aligned to the composition lines and composition line intersections, can result in a well-composed image. Generally, a reference armature operates as a guide to position (e.g., place, align, orient, etc.) objects in an image along the composition lines of the reference armature and at the location where the composition lines of the reference armature intersect. When the most important visual elements of an image are positioned along the lines of and at the intersection of reference armature composition lines, the more likely the image will be well-composed. A reference armature can specifically be a harmonic armature, as described herein. Nonetheless, the techniques for adaptively generating a subset of composition lines from a reference armature can be applied to different reference armatures, also referred to in this disclosure as composition templates. As such, other reference armatures can include the rule-of-thirds reference armature, rule-of-triangles reference armature, golden triangles reference armature, centered composition and symmetry reference armature, and leading lines reference armature.

Adaptive Image Armature—As used herein, the term "adaptive image armature" refers to a subset of composition lines associated with a reference armature that can be displayed over an image to indicate the image's composition based upon the position of objects in the image with respect to the subset of composition lines. As the position of the objects in an image change, the adaptive image armature also changes (e.g., the subset of composition lines change). This change can happen iteratively, adaptively, and in real-time. Adaptive image armatures provide visual guidance to a user (e.g., photographer, marketer, etc.) indicating particular adjustments that, if made, may result in a more well-composed and thus a more visually pleasing image. The subset of composition lines included in the adaptive image armature may include as few as one composition line or as many as all composition lines of the reference armature.

Model Armature Template—As used herein, the term "model armature template" refers to a subset of composition lines. In particular, a model subset of composition lines associated with a reference armature, such that the model subset of composition lines may be selected to identify another image whose composition conforms to the model armature template. In other words, a model armature template can be used to determine (e.g., identify) an image, such as an image from an image database, whose composition correlates to the model armature template. Once an image that matches the model armature template is determined, the model armature template can provide visual guidance to a user (e.g., photographer, marketer, etc.) indicating particular adjustments that, if made, may result in a more well-composed and thus a more visually pleasing image. The model subset of composition lines included in each of the model armature template may include as few as one composition line or as many as all composition lines of the reference armature.

Alignment Map—As used herein, the term "alignment map" refers to a visual representation of an arrangement of objects in an image relative to a reference armature. In particular, an alignment map may be a saliency map of an image combined with an overlay of a set of composition lines associated with a reference armature. In computer vision, a saliency map can simplify or change the representation of an image into something that is more meaningful and easier to analyze. For example, the saliency map can be a value-based representation of the positon of objects within an image. In particular, a saliency map can be an image that shows each pixel's unique quality. For example, if a pixel has a high grey level or other unique color quality in a color image, that pixel's quality will show in the saliency map and in an obvious way. Overlaying the reference armature composition lines assists in identifying which objects within the image are aligned with the composition lines and intersection points of the reference armature. For example, given an image of the moon, an alignment map of that image would include a saliency map of the moon with an overlay of the set of composition lines associated with a reference armature. The alignment map would visually indicate which subset composition lines of the reference armature align or most closely align to (e.g., match) the position of the moon in the image using a value-based representation. In this regard, alignment maps assist in the determination of which subset of composition lines of the reference armature to include within an adaptive image armature.

Composition-Style—As used herein, the term "composition-style" refers to at least two model armature templates defining a combined appearance, mode, or reference form that is identifiable in a set of images. Each model armature template included in the composition-style includes a model subset of composition lines associated with a reference armature that can each be displayed over an image. Displaying a model armature template over an image indicates the image's composition aligns or closely aligns with (e.g., matches) the composition of the model armature template where the alignment is based upon an alignment between the position of objects in the image and the model subset of composition lines included in the model armature template. For example, a professional photographer may be famous for photographing images that conform to either a rule-of-thirds reference armature or golden triangle reference armature. In such a case, the composition-style of the professional photographer would at least include the rule-of-thirds reference armature and golden triangle reference armature.

Exemplary Adaptive Image Armature Generation Environment

Turning now to FIG. 1, a schematic depiction is provided illustrating an exemplary adaptive image armature generation environment 100 in which some embodiments of the present disclosure may be employed. Among other components not shown, adaptive image armature generation environment 100 may include an adaptive image armature generation engine 102, a user device, such as user devices 104A, 104B, and 104C, a data store 106, and a distributed computing environment 110. It should be understood that adaptive image armature generation environment 100 shown in FIG. 1 is an example of one suitable computing system. The components of the adaptive image armature generation environment 100 may communicate with each other over one or more networks (e.g., public network or virtual private network "VPN") as shown with network 108. The network 108 may include, without limitation, one or more local area networks (LANs) and/or wide area networks (WANs). Any of the components shown in FIG. 1 may be implemented via any type of computing device, such as computing device 1200 described with reference to FIG. 12, for example.

The components of adaptive image armature generation environment 100 may operate together to provide functionality of generating adaptive image armatures for images from a reference armature. In particular, distributed computing environment 110 hosts adaptive image armature generation engine 102. Generally, adaptive image armature generation environment 100 facilitates adaptive image armature generation based on an alignment between composition lines of a reference armature and the position of an object in an image. At a high-level, adaptive image armatures are generated by determining and analyzing an alignment map and, based on a scoring and ranking system, determining a subset of composition lines of a reference armature which best align or most closely aligns with (e.g., matches, correlates) the objects in the image. Generating the alignment map is based at least in part on generating a saliency map for the image and overlaying the composition lines of the reference armature on the saliency map.

A user device, such as user devices 104A through 104C, can access adaptive image armature generation engine 102, hosted by the distributed computing environment 110 (e.g., a server), over a network 108 (e.g., a LAN or the Internet). For instance, a user device, such as user devices 104A through 104C may provide and/or receive data from the adaptive image armature generation engine 102 via the network 108.

A user device, such as user devices 104A through 104C, may be any computing device that is capable of accessing an image encoded in image data during image-capturing operations, image-editing operations, or image-querying operations. Image-capturing operations, as described herein, generally refers to the act of capturing (e.g., taking, photographing, etc.) an image. Image-editing operations, as described herein, generally refers to the act of editing (e.g., rotating, cropping, filtering, adjusting, modifying) an already captured image. Image-querying operations, as described herein, generally refers to the act of querying (e.g., searching) for an already captured image whose composition aligns or closely aligns with (e.g., matches) a model armature template. For example, adaptive image armature engine 102 may access an image via an application (e.g., photography application) installed on a user device, such as user devices 104A through 104C. Further, any type of user interface may be used to access such image. In some cases, adaptive image armature engine 102 may access an image, for example, via a user copying/pasting the image or selecting the image from a data store, such as data store 106.

In some embodiments, in response to accessing an image, a user device, such as user devices 104A through 104C, determines and/or displays an adaptive image armature on the image. In this regard, adaptive image armatures determined in response to an accessed and analyzed image are provided to the user device for display to the user in real-time on the image. In some cases, a user device accesses the adaptive image armature generation engine 102 via a web browser, terminal, or standalone PC application operable on the user device. A user device might be operated by an administrator, which may be an individual or set of individuals that manages generation of better-composed images using adaptive image armatures. By way of example, a user may be any individual, such as an amateur photographer, marketer, or photography student that desires to capture an image. While only user devices 104A through 104C are illustrated in FIG. 1, multiple other user devices associated with any number of users may be utilized to carry out embodiments described herein.

In some cases, a user of distributed computing environment 110 may employ one or more user interfaces via a web browser, terminal, or standalone PC application operable on the distributed computing environment to control and/or operate adaptive image armature generation engine 102 to generate adaptive image armatures. Users of distributed computing environment 110 may further control and/or operate adaptive image armature generation engine 102 to further modify already captured images using generated adaptive image armatures that may be displayed on a user device, such as user devices 104A through 104C. Users of distributed computing environment 110 may further control and/or operate adaptive image armature generation engine 102 to identify images that align with or most closely align with a model armature template that may be displayed on a user device, such as user devices 104A through 104C.

Distributed computing environment 110 may be operated by a user, which may be an individual or set of individuals who manage the capturing, editing, or identification of images associated with, for example, a photoshoot for a client, an advertising campaign, a social media influencing strategy, and the like. For instance, a user may be any individual, such as an amateur photographer that desires to take better-composed images in an attempt to build a photography portfolio. A user may also be a travel agent that desires to edit already captured images that will be used in a vacation destination marketing campaign. A user may also be a photography student that desires to locate images whose composition aligns (e.g., matches) the composition of a model armature template. While only distributed computing environment 110 is illustrated in FIG. 1, multiple other distributed computing devices associated with any number of users may be utilized to carry out embodiments described herein.

Data store 106 includes, among other data, image data that may contain desired information used to facilitate adaptive image armature generation. As described in more detail below, data store 106 may include image data including various different images, armatures, and the like and/or metadata associated therewith. Image data in data store 106 may also include position information and/or metadata associated therewith associated with objects in images within data store 106. Such image data may be stored in the data store 106 and accessible to any component of the adaptive image armature generation environment 100. Data store 106 may also be updated at any time, including an increase or decrease in the amount of images, armatures, and the like. Further, the image data, or any other data, contained within data store 106 may be changed, altered, updated, or the like, at any time.

Although FIG. 1 illustrates a distributed system in which adaptive image armature generation engine 102 is located on a server remote from user devices 104A through 104C (e.g., distributed computing environment 110), in other embodiments, adaptive image armature generation engine 102 can be located on, executed by, or otherwise installed on a user device, such as user devices 104A through 104C. Additionally and/or alternatively, in other embodiments, at least one component of adaptive image armature generation engine 102 can be located on a user device, such as user devices 104A through 104C.

Figure 2:
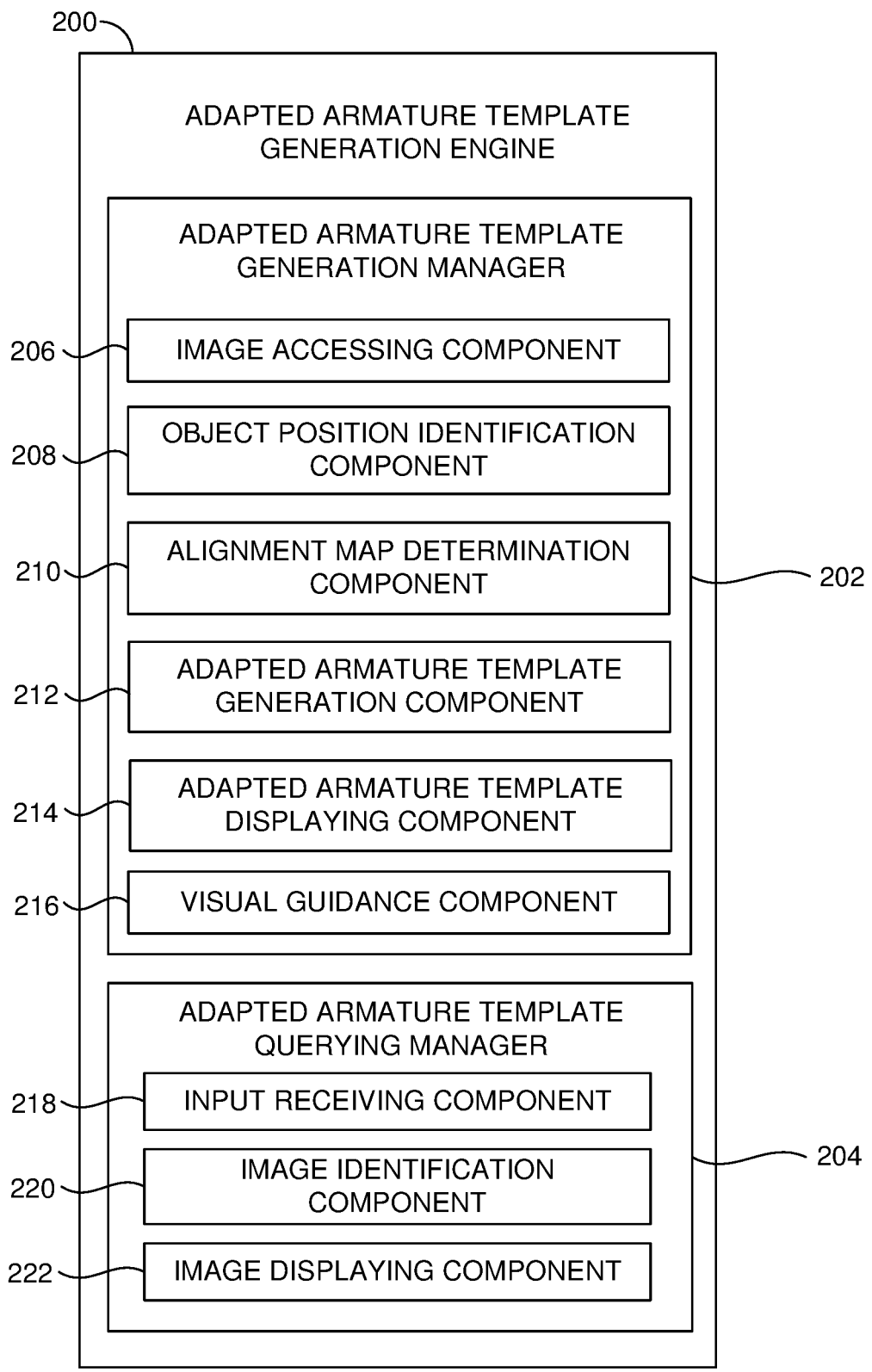
FIG. 2 is a depiction of an adaptive image armature generation engine, in accordance with embodiments of the present disclosure.

An exemplary adaptive image armature generation engine is provided in FIG. 2. As shown in FIG. 2, the adaptive image armature generation engine 200 includes adaptive image armature generation manager 202 and adaptive image armature querying manger 204. Adaptive image armature generation manager 202 includes image accessing component 206, object position identification component 208, alignment map determination component 210, adaptive image armature generation component 212, adaptive image armature displaying component 214, and visual guidance component 216. Adaptive image armature querying manger 204 includes input receiving component 218, image identification component 220, and image displaying component 222.

Adaptive image armature generation manager 202 is generally configured to generate adaptive image armatures during image-capturing operations and image-editing operations. Image accessing component 206 is generally configured to access an image encoded in image data. Object position identification component 208 is generally configured to identify a position of an object in an image. Alignment map determination component 210 is generally configured to access a reference armature for the image and determine (e.g., generate) an alignment map for the image that includes a saliency map of the image and an overlay of composition lines of the reference armature. Adaptive image armature generation component 212 is generally configured to determine a subset of the composition lines of the reference armature that is included in an adaptive image armature. Adaptive image armature displaying component 214 is generally configured to display the generated adaptive image armatures on the image. Visual guidance component 216 is generally configured to provide visual guidance within an adaptive image armature indicating adjustments to assist in generating a better-composed image.

Adaptive image armature querying manager 204 is generally configured to identify (e.g., determine) images, such as images in an image database (e.g., a data store, such as data store 106 of FIG. 1) having a composition that correlates to a model armature template. Input receiving component 218 is generally configured to receive a selection of a model armature template that includes a model subset of composition lines from a set of composition lines associated with a reference armature. Input receiving component 218 can also receive a composition-style, including at least two model armature templates that each include a model subset of composition lines from a set of composition lines associated with the reference armature. Image identification component 220 is generally configured to identify an image that corresponds to a model armature template. Image displaying component 222 is generally configured to display the image and model armature template on the image.

As described herein, image accessing component 206 is generally configured to access an image encoded in image data for which adaptive image armature generation engine 202 can generate an adaptive image armature. As such, an image can be accessed in a variety of manners, including during image-capturing operations and image-editing operations. An image, such as an image accessed by image accessing component 206, may be stored in an image database, such as data store 106 of FIG. 1. An image may also be a visual representation of an environment that has yet to be captured. For example, an image can include a beach environment that has yet to be captured and/or stored in an image database.

An image encoded in image data is accessed, retrieved, or opened by image accessing component 206 in any manner. In some cases, an image is accessed when a user (e.g., photographer) opens a photography application on a user device (e.g., tablet) such as user devices 104A through 104C of FIG. 1, which is connected to network 108. For instance, during image-capturing operations, a photographer may open the camera application on a tablet and point the camera of the tablet at a beach environment the photographer wants to capture. In other cases, an image is accessed when a user selects an image stored in an image database, such as data store 106 of FIG. 1 via a user device, such as user devices 104A through 104C of FIG. 1. For instance, during image-editing operations, a photographer may select an image stored in an image database to edit.

Object position identification component 208 is generally configured to identify the position of an object(s) in an image. As described herein, an object may include an element (e.g., visually important element) in an image (e.g., faces, animals, vehicles, plants, buildings, and the like). The position of an object includes its location, placement, orientation, and/or the like in an image. Object positioning component 208 can identify the position of objects in an image using any number of computer vision techniques. Such techniques include deep learning techniques, color range or saliency detection, thresholding, clustering methods, compression-based methods, histogram-based methods, edge detection, dual clustering methods, graph partitioning methods, watershed transformation, model-based segmentation, multi-scale segmentation, and semi-automatic segmentation. Specifically, the deep learning techniques can include instance-level semantic segmentation, automatic boundary-aware human cutout, object detection using cascaded neural networks, generic algorithms for segmentation such as regional convolutional neural network (R-CNN) and/or mask R-CNN. Object position identification component 208 is also configured to identify changes in the position of an object in an image to subsequent positions, as well as detect the position of new objects in an image or the deletion (e.g., omission, removal) of objects in an image.

Alignment map determination component 210 is generally configured to access a reference armature for an image and determine (e.g., generate) an alignment map for the image. As described, an alignment map may include a saliency map of the image and an overlay of composition lines of a reference armature. Initially, alignment map determination component 210 can access a reference armature (e.g., a harmonic armature) for an image. The reference armature includes a plurality of composition lines that define a frame of reference for image composition. For example, a harmonic armature generally includes fourteen composition lines, including two main diagonal composition lines that cross the reference armature (e.g., composition lines 302a and 302b of FIG. 3), four reciprocal composition lines (e.g., composition lines 304a, 304b, 304c, and 304d of FIG. 3) of the two main diagonal composition lines, center vertical and horizontal composition lines (e.g., composition lines 306a and 306b of FIG. 3) and additional vertical and horizontal composition lines (e.g., composition lines 308a, 308b, 308c, 308d, 310a, and 310b of FIG. 3).

As can be appreciated, adaptive image armature generation engine 200 can access any number of reference armatures to generate adaptive image armatures. The adaptive image armature generated by adaptive image armature generation engine 200 depends at least in part on the reference armature accessed by alignment map determination component 210 as the number of composition lines and intersection points included in each armature are not identical. For example, the total number of composition lines included in a harmonic reference armature does not equal the total number of composition lines included in a rule-of-thirds reference armature (i.e., the total number of composition lines included in a harmonic reference armature is a superset of the total number of composition lines included in a rule-of-thirds reference armature).

In accordance with accessing a reference armature, the alignment map determination component 210 can determine an alignment map using the reference armature. In particular, alignment map determination component 210 generates a saliency map for the image, where the saliency map is a value-based representation of the position (e.g., location, orientation) of the object in the image. As can be appreciated, alignment map determination component 210 can generate (e.g., determine, compute) the saliency map in various ways, including for example, using DeepGaze II. Other methods that capture saliency and human gaze may also be used to generate a saliency map for an image. As can further be appreciated, other algorithms and computer vision techniques may be used for image processing in addition to a saliency map. Each pixel in the saliency map is assigned a value based on its visual importance. As such, pixels that comprise an object (e.g., a visually important element) in an image will have a higher value than pixels that do not comprise an object in an image. Alignment map determination component 210 overlays the composition lines included in the reference armature on the saliency map.

Adaptive image armature generation component 212 is generally configured to use the alignment map to determine a subset of the composition lines of a reference armature included in an adaptive image armature. In particular, using the alignment map, the adaptive image armature generation component 212 generates an alignment score for each composition line of the plurality of composition lines of the reference armature in the alignment map. Each alignment score for each composition line represents an extent to which the position of an object(s) (as represented in the saliency map) in the image aligns with each composition line of the alignment map. In the alternative, a score may be for a selected or corresponding (e.g., intersecting) composition line for the object. The higher the alignment score for a given composition line, the better an object in the image is aligned to that composition line. For example, assume an image includes a single detected object in its lower right corner. In such a case, the alignment score for the composition lines that align or most closely align (e.g., match) with the object in the lower right corner will have higher alignment scores than the composition lines that do not align with the object.

Generating the alignment score for each object in the image may specifically be based on the value-based representation of each object in the saliency map of the alignment map. In particular, the value-based representation (e.g., pixel saliency value) can be associated with pixels in the image. At a high level, the pixel saliency values of the pixels proximate to a particular composition line can be added to generate an alignment score of the composition line. As such, each pixel contributes to the alignment score of a given composition line. A Gaussian kernel is defined in one-dimension (1D), two-dimensions (2D), and N-dimensions (ND), respectively as:

$$G_{1D}(x;\sigma) = \frac{1}{\sigma\sqrt{2\pi}}e^{-\frac{(x-\mu)^2}{2\sigma^2}} ; G_{2D}(x;y;\sigma) = \frac{1}{2\pi\sigma^2}e^{-\frac{x^2+y^2}{2\sigma^2}} ;$$

$$G_{ND}(\vec{x};\sigma) = \frac{1}{(\sqrt{2\pi}\,\sigma)^N}e^{-\frac{|\vec{x}|^2}{2\sigma^2}}$$

where σ determines the width of the Gaussian kernel and, in 1D, the term $$\frac{1}{\sigma\sqrt{2\pi}}$$

is the normalization constant. The equation used to generate alignment scores for each composition line in terms of each point's contribution to the alignment score for each composition line is expressed by:

$$C_p = S_p * \text{Gaussian}(\text{distance}(p,L))$$

for a Gaussian kernel with a size 1/10 the saliency map's longer dimension and a σ of 1/4 of the size. Here, p denotes a point included in the saliency map, $S_p$ denotes the saliency value for a given point p, L denotes a composition line included in the saliency map, and $C_p$ denotes the score each point in the saliency map contributes to the alignment score of a given composition line L. The sum of all contribution scores $C_p$ for all points p in the saliency map for a given composition line L is the non-normalized alignment score for that composition line. Each non-normalized alignment score is normalized by the length of its corresponding composition line to determine that composition line's alignment score.

Based on the generated alignment scores for each composition line of the reference armature, adaptive image armature generation component 212 may generate a ranking for each composition line. In implementation, composition lines with higher scores are ranked higher than composition lines with lower scores. Based on the ranking for each composition line, adaptive image armature generation component 212 automatically generates the adaptive image armature by selecting the subset of composition lines included within the adaptive image armature. Lower scoring and/or zero scoring composition lines are typically not included in the adaptive image armature while the highest score and/or higher scoring composition lines typically are included in the adaptive image armature. In some embodiments, adaptive image armature generation component 212 selects a subset of composition lines in which each composition line selected scored above a threshold value (e.g., the 80% quantile) of all determined alignment scores.

In some cases, the highest scoring composition line may not be included in an adaptive image armature without at least a second composition line. For example, assume adaptive image armature generation component 212 determines the highest scoring composition line (e.g., the composition line with the highest alignment score) is a reciprocal diagonal composition line, such as composition lines 304a, 304b, 304c, and 304d of FIG. 3. It is generally compositionally undesirable for an adaptive image armature to include a single reciprocal diagonal composition line without also including a main diagonal composition line, such as composition lines 302a and 302b of FIG. 3. In this regard, adaptive image armature generation component 212 compares the alignment scores for each composition line. In such a case where a reciprocal diagonal composition line has the highest alignment score, adaptive image armature generation component 212 assigns the main diagonal composition line that intersects the reciprocal diagonal composition line the same alignment score. In this way, adaptive image armature generation component 212 ensures the generated adaptive image armature does not include only a reciprocal diagonal composition line.

Figure 3:
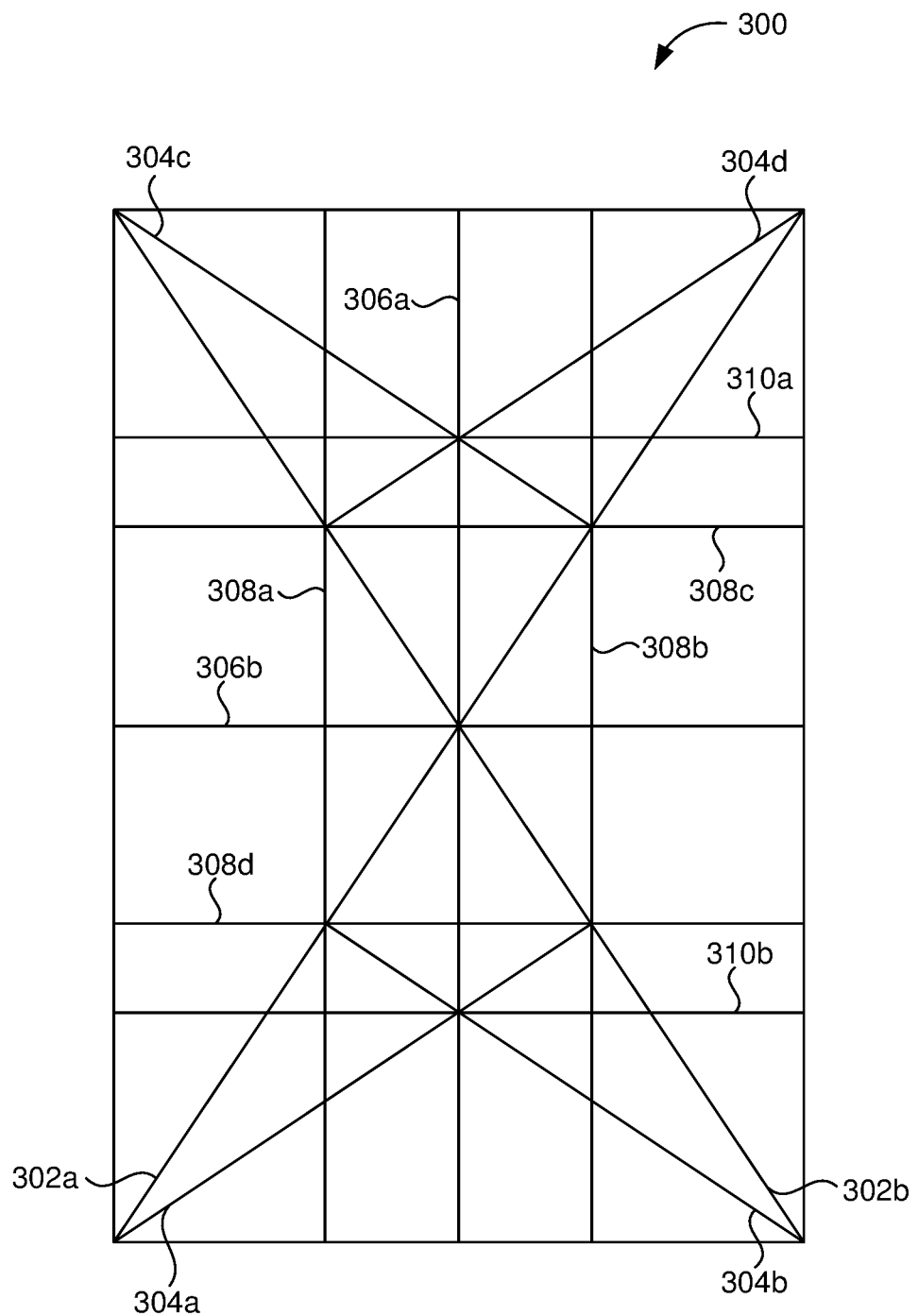
FIG. 3 is a depiction of a reference armature, in accordance with embodiments of the present disclosure.

With reference to FIG. 3 illustrating an example reference armature, a reference armature has several sets of vertical and horizontal composition lines, such as center vertical and horizontal composition lines (e.g., composition lines 306a and 306b of FIG. 3) and additional vertical and horizontal composition lines (e.g., composition lines 308a, 308b, 308c, 308d, 310a, and 310b of FIG. 3). It is generally compositionally undesirable for an adaptive image armature to include all horizontal sets of composition lines or all vertical sets of composition lines in an adaptive image armature. In this regard, adaptive image armature generation component 212 identifies the horizontal composition line with the highest alignment score and sets each additional horizontal composition line in that horizontal composition line's set to the same score, while setting the alignment score for all other horizontal composition lines to zero. Similarly, adaptive image armature generation component 212 identifies the vertical composition line with the highest alignment score and sets each additional vertical composition line in that vertical composition line's set to the same score, while setting the alignment score for all other vertical composition lines to zero. In this way, adaptive image armature generation component 212 ensures an adaptive image armature includes at most only one set of horizontal composition lines and one set of vertical composition lines.

Adaptive image armature displaying component 214 is generally configured to display, or cause display of, the generated adaptive image armature on an image. In particular, adaptive image armature displaying component 214 is configured to display the adaptive image armature on an image during image-capturing operations and image-editing operations. For example, display devices that are suitable for displaying a user interface include a computer monitor, a projector, a television, a monitor on a laptop computer, a display on a PDA, and a display on a mobile phone or a tablet (i.e., a user device). It should be noted that any application or operating system utilizing application windows or the equivalent thereof provides a suitable operating environment for practicing the present disclosure.

Visual guidance component 216 is generally configured to provide visual guidance within an adaptive image armature such that the visual guidance indicates adjustments to assist in generating a better-composed image. Visual guidance component 216 may provide visual guidance within an adaptive image armature during image-capturing operations and image-editing operations. The visual guidance can include instructions to the user on how to capture image of the object based on the adaptive image armature. Visual guidance may include at least one composition line included in the adaptive image armature in a color (e.g., red, yellow) other than that used for the remaining subset of composition lines included in the adaptive image armature. Each color may signify an adjustment that could be made (e.g., rotation, crop) or an object that is either misaligned or missing entirely from the image.

By way of example, assume adaptive image armature displaying component 214 displays an adaptive image armature that includes three composition lines for an image that includes two objects. The first composition line is blue and indicates a first object is well aligned (e.g., is fitted to that composition line). The second composition line is yellow and indicates the second object is close to but not entirely aligned with the second composition line (e.g., is not entirely fitted to that composition line). Further, the second composition line indicates adjustments to the user, such as adjusting the position of the second object, that if made would assist in aligning the second object with the second composition line. The third composition line is red and indicates the lack of an object in its entirety. Additionally, the third composition line indicates an adjustment can be made by, for example introducing a new object into the image. As the positions of the objects in the image change (e.g., adding new objects, moving objects to subsequent positions, etc.), visual guidance component 216 adaptively (e.g., iteratively) updates the visual guidance included in the adaptive image armature in real-time.

Visual guidance may specifically include information indicating the additional insights between the adaptive image armature and the reference armature. For example, the visual guidance may highlight the primary subset of composition lines for a first adaptive image armature, while indicating alternative secondary adaptive image armatures that are selectable from the reference armature template. The insights may be associated with different features (e.g., selectable options, text, icons) of image composition. Using the insights, an interactive graphical user interface is selectable to provide text-based feedback to the user. For example, a first image may be captured with a first adaptive image armature, and the visual guidance may identify other secondary adaptive image armatures instructing the user to try alternatives. In this regard, visual guidance can be generated specifically to indicate to the user an explanation of one or more recommended image compositions options, while allowing user control elements to selectively implement the recommendation as deemed appropriate by the user.

Returning now to adaptive image armature querying manager 204, adaptive image armature querying manager 204 is generally configured to identify (e.g., determine) images, such as images in an image database (e.g., a data store, such as data store 106 of FIG. 1) whose composition correlates to a model armature template. The adaptive image armature querying manager 204 is configured to identify another image whose composition conforms to the model armature template. As such, a composition of a first image may be used to identify other images having a similar composition.

Generally, a selection of a model armature template is received, collected, or obtained by input receiving component 218 in any manner. In some cases, a model armature template is provided by a user of adaptive image armature generation engine 200 of FIG. 2, such as a photographer, photography student, marketer, and the like. For example, a photographer might select or input a model armature template via a graphical user interface accessible by way of an application on a user device. Another photographer might select, for example, a model armature template with which the photographer wishes to identify similarly composed images. In other cases, a composition-style, including at least two model armature templates is provided by a user of adaptive image armature generation engine 200 of FIG. 2.

Image identification component 220 is generally configured to identify an image that corresponds to a model armature template. More specifically, image identification component 220 is configured to determine whether the image corresponds to the model armature template. Determining whether the image corresponds to the model armature template is based on determining an alignment map, determining an adaptive image armature for the image based on the alignment map, and determining the adaptive image armature correlates with the model armature template.

At a high level, an image corresponds to a model armature template when the composition lines of the image conform to a model subset of composition lines of the model armature template. Image identification component 220 determines an alignment map that includes alignment information between a plurality of composition lines of the reference armature and an identified position of an object in the image. Moreover, image identification component 220 analyzes the image based on an alignment map in a similar way (e.g., generating a saliency map, overlaying the reference armature) to alignment map determination component 210 described in detail above.

As discussed with reference to image-capturing, image-querying includes the image identification component 220 configured to configure an adaptive image armature based on the alignment map for the image. The determined adaptive image armature includes a subset of composition lines of the reference armature. The image identification component 220 determines the adaptive image armature based on scoring a ranking system in a similar way (e.g., generating an alignment score for each composition line of the plurality of composition lines in the reference armature, generating a ranking for each composition line, selecting the subset of composition lines to include in the adaptive image armature) to adaptive image armature generation component 212 described in detail above. Image identification component 220 further determines whether the adaptive image armature of the image correlates with the model armature template. Based on the adaptive image armature correlating with the model armature template, image identification component 220 determines that the image corresponds with the model armature template.

Image displaying component 222 is generally configured to display the image and the model armature template with which the image aligns (e.g., matches, closely matches) on the image. For example, for a model armature template that includes a model subset of composition lines, an image with a composition (i.e., composition lines determined using the reference armature template) that conforms to the model armature template is caused to be displayed as a corresponding image to the model armature template.

In situations where a user selects a composition style (e.g., at least two model armature templates), image displaying component 222 is configured to display an identified image and the model armature template of the composition-style with which the identified image correlates on the identified image. Image displaying component 222 is also generally configured to provide visual guidance within an adaptive image armature indicating adjustments to assist in generating a better-composed image. Image displaying component 222 provides visual guidance within an adaptive image armature during image-querying operations.

Turning now to FIG. 3, a depiction of a reference armature is provided, designated generally as reference armature 300. In particular, reference armature 300 is a harmonic armature. As can be appreciated, reference armature 300 can be any reference armature (e.g., rule-of-thirds reference armature, gold triangle reference armature). Reference armature 300 includes fourteen composition lines, including two main diagonal composition lines 302a and 302b, four reciprocal composition lines 304a, 304b, 304c, and 304d, center vertical composition line and center horizontal composition line 306a and 306b, and additional vertical and horizontal composition lines 308a, 308b, 308c, 308d, 310a, and 310b. The set of composition lines included in reference armature 300 represent a composition of an image. In operation, reference armature 300 is associated with an image. An adaptive image armature comprises a subset of the composition lines included in a reference armature, such as reference armature 300. As described herein, alignment scores and ranks for each composition line of a reference armature, such as reference armature 300, are determined. Based on those determined scores and ranks, a subset of the composition lines of the reference armature, such as reference armature 300, are identified and included in an adaptive image armature.

Figure 4B:
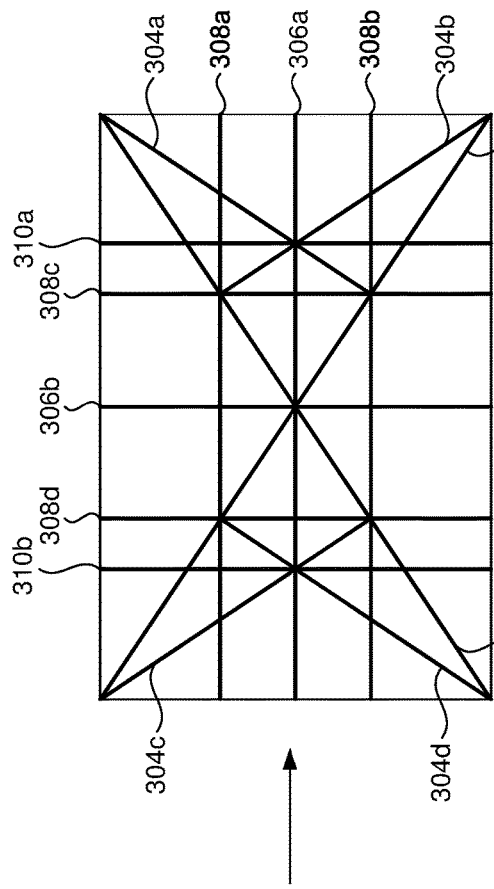
FIGS. 4a-4d are schematic diagrams showing exemplary user interfaces illustrating the generation of an adaptive image armature, in accordance with embodiments of the present disclosure.
Figure 4D:
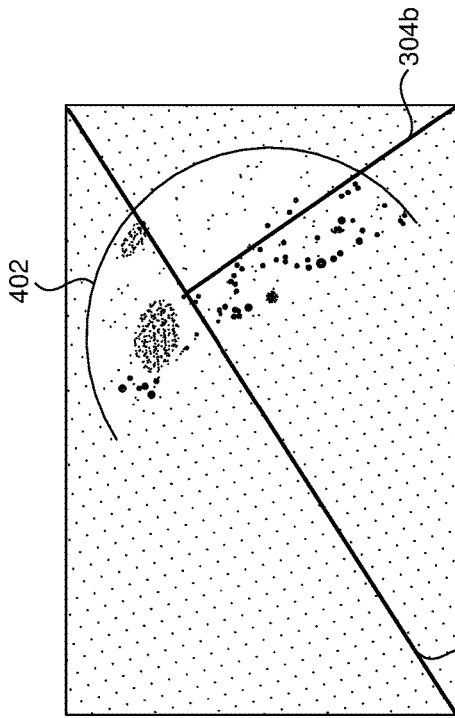
Figure 4A:
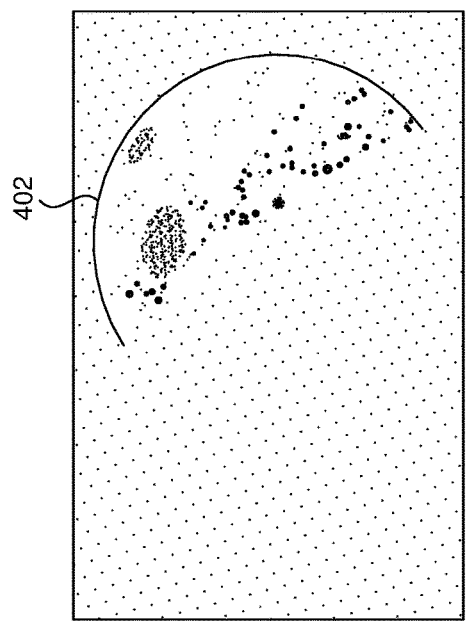
Figure 4C:
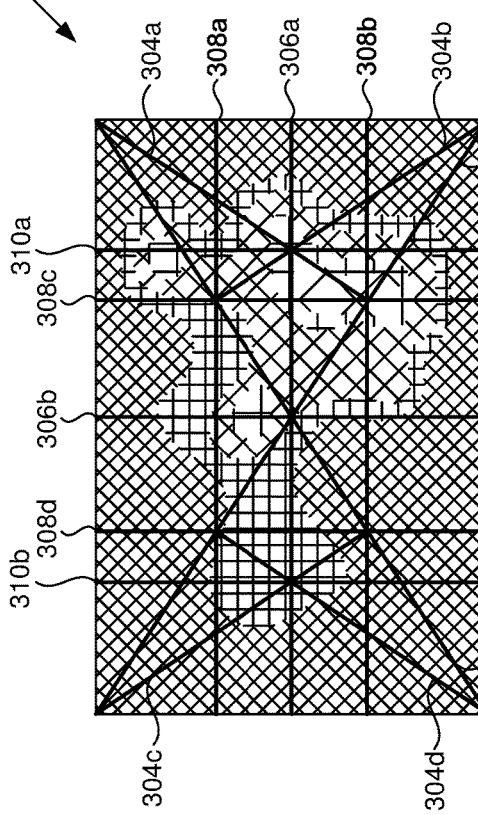
Figure 5A:
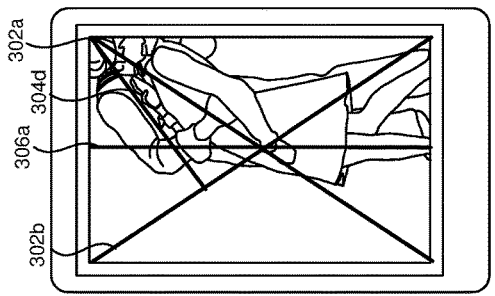
FIGS. 5a-5h are schematic diagrams showing exemplary user interfaces illustrating adaptive image armatures adapting (e.g., iteratively updating) in real-time based on the position of the objects in the image, in accordance with embodiments of the present disclosure.
Figure 5B:
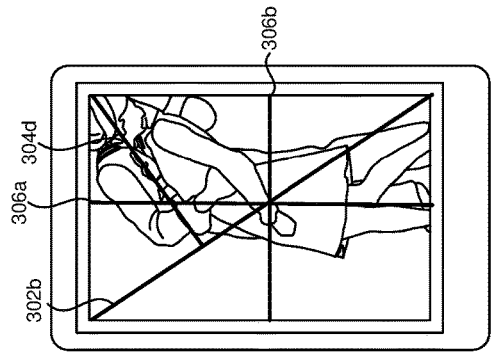
Figure 5C:
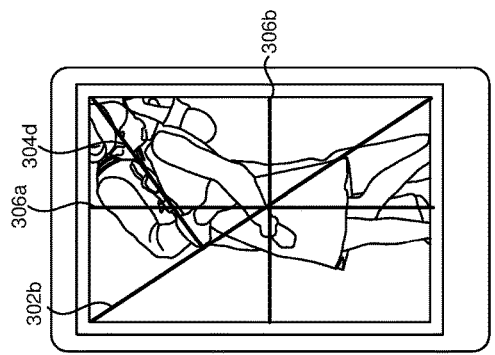
Figure 5D:
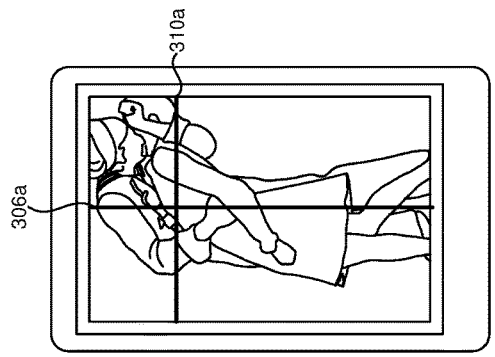
Figure 5E:
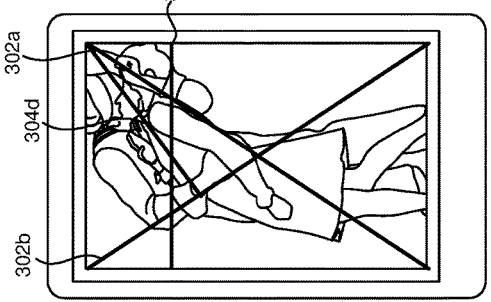
Figure 5F:
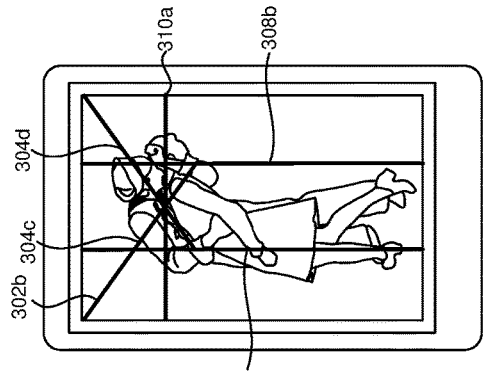
Figure 5G:
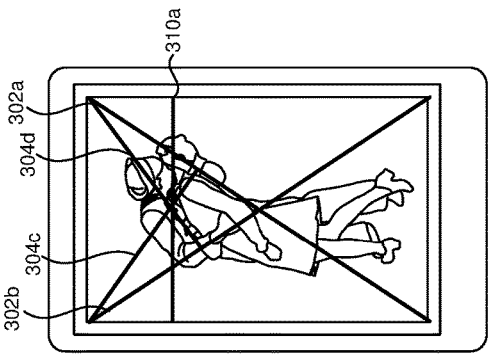
Figure 5H:
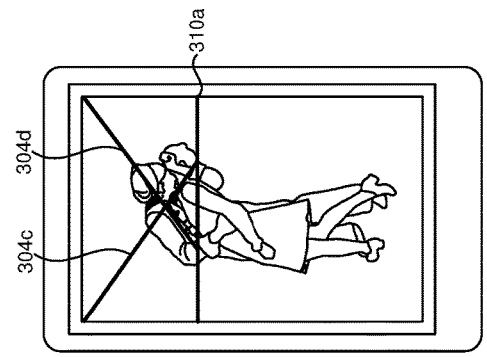

FIGS. 4a-4d each provide a schematic diagram showing exemplary user interfaces illustrating the generation of an adaptive image armature. FIG. 4a is an image that includes object 402. As described herein, the position of object 402 can be detected by an object position identification component, such as object position identification component 208 of FIG. 2. FIG. 4b is a reference armature, such as reference armature 300 of FIG. 3. FIG. 4b includes fourteen composition lines, including two main diagonal composition lines 302a and 302b, four reciprocal composition lines 304a, 304b, 304c, and 304d, center vertical composition line and center horizontal composition line 306a and 306b, and additional vertical and horizontal composition lines 308a, 308b, 308c, 308d, 310a, and 310b. The composition lines of FIG. 4b define a frame of reference for image composition. FIG. 4c is an alignment map that includes a saliency map of FIG. 4a, and an overlay of composition lines, such as the composition lines included in FIG. 4b.

As described herein, an alignment map, such as alignment map FIG. 4c can be generated (e.g., determined) by an alignment map determination component, such as alignment map determination component 212 of FIG. 2. As described herein, pixels of the saliency map that align with or closely align with a composition line of a reference armature, such as reference armature 300 of FIG. 3, contribute more to that composition line's alignment score than to pixels that do not align with the composition lines. FIG. 4d includes image 402 with an adaptive image armature overlay. The adaptive image armature on FIG. 4d includes a subset of the composition lines of FIG. 4b, and more specifically, includes main diagonal composition line 302b and reciprocal composition line 304b. As described herein, an adaptive image armature, such as the one depicted in FIG. 4d, can be determined (e.g., identified) using an adaptive image armature generation component, such as adaptive image armature generation component 212 of FIG. 2 and displayed by an adaptive image armature displaying component, such as adaptive image armature displaying component 214 of FIG. 2.

Referring now to FIGS. 5a-5h, schematic diagrams showing exemplary user interfaces illustrating adaptive image armatures adapting (e.g., iteratively updating) in real-time based on the position of the objects in the image are provided in accordance with embodiments of the present disclosure. FIGS. 5a through 5h each include a subset of composition lines of a reference armature (e.g., an adaptive image armature), such as reference armature 300 of FIG. 3. More particularly, FIGS. 5a through 5h include at least one of two main diagonal composition lines 302a and 302b, four reciprocal composition lines 304a, 304b, 304c, and 304d, center vertical composition line and center horizontal composition line 306a and 306b, and additional vertical and horizontal composition lines 308a, 308b, 308c, 308d, 310a, and 310b. As the position of the images change of FIGS. 5a through 5h to subsequent positions, the subset of lines (e.g., the adaptive image armature displayed on the image to the user in real-time) also changes in real-time.

Referring now to FIGS. 6a-6c, schematic diagrams showing exemplary user interfaces illustrating an adaptive image armature including visual guidance are provided in accordance with embodiments of the present disclosure. In particular, FIG. 6a includes composition lines 304a, 306a, and 308c (e.g., an adaptive image armature) that a user (e.g., photographer) desires to imitate. FIG. 6b depicts the current state of the user's image that is closely but not entirely aligned to the desired adaptive image armature in FIG. 6a. In this regard, FIG. 6b depicts an adaptive image armature that includes only composition lines 304b and 308c, indicating to the user the current composition of the image. FIG. 6c includes composition lines 304a, 306a, and 308c, where composition lines 304a and 306a act as visual guidance indicating to the user adjustments that can be made to align the current image with a desired adaptive image armature to achieve a better-composed image. As described herein, composition line 304a in FIG. 6c may indicate to a user that an object is closely but not entirely aligned with that composition line. Visual guidance relating to composition line 304a of FIG. 6c may indicate to a user adjustments (e.g., rotation, crop) to achieve a better-composed image. Similarly, visual guidance relating to composition line 306a in FIG. 6c may indicate to a user adjustments (e.g., addition of a new object into the image) to achieve a better-composed image.

Figure 7B:
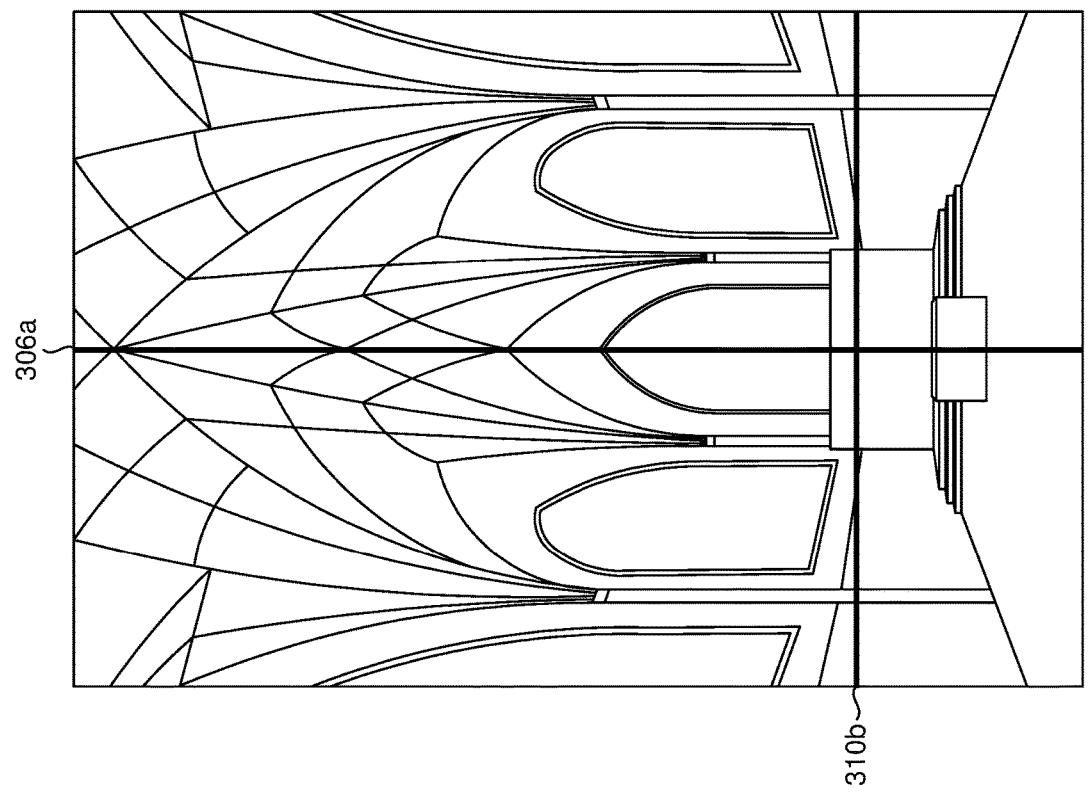
FIGS. 7a-7b are schematic diagrams showing exemplary user interfaces illustrating adaptive image armatures, in accordance with embodiments of the present disclosure.
Figure 7A:
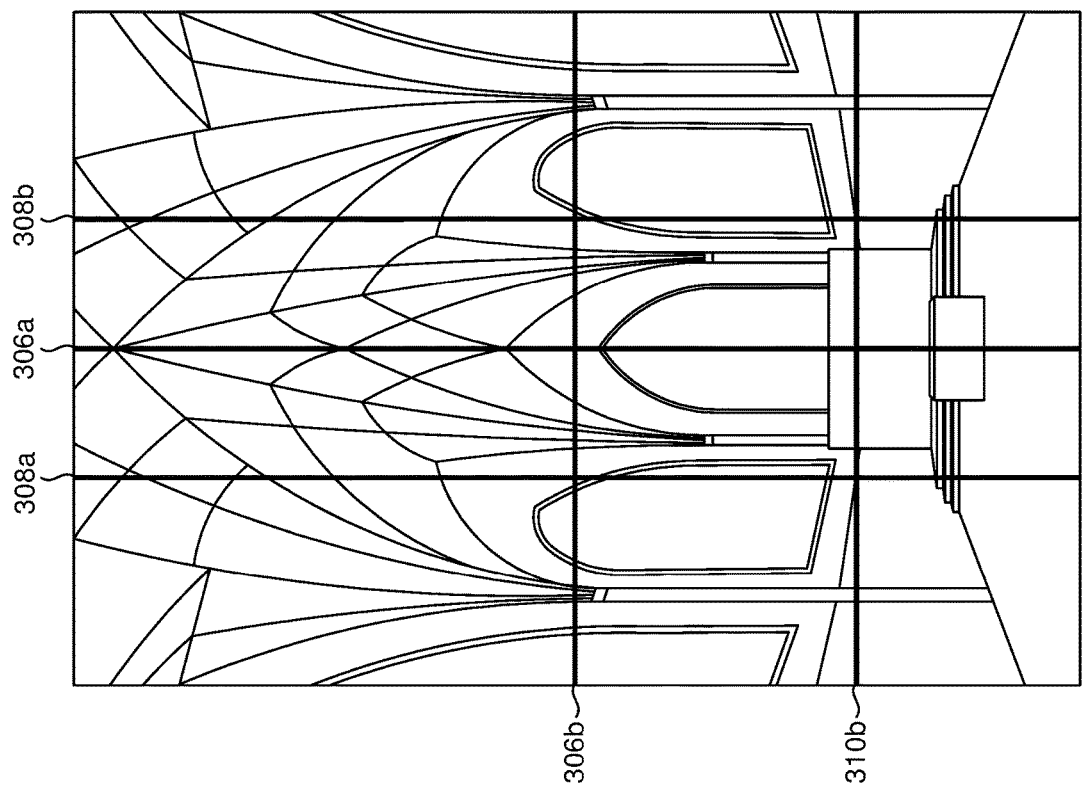

Referring now to FIGS. 7a-7b, schematic diagrams showing exemplary user interfaces illustrating adaptive image armatures are provided in accordance with embodiments of the present disclosure. FIG. 7a depicts an image with a cluttered adaptive image armature, which includes composition lines 306a, 306b, 308a, 308b, and 310b. FIG. 7b depicts a less cluttered, more useful adaptive image armature, which includes composition lines 306a and 310b. As described in detail above, it is generally compositionally undesirable for an adaptive image armature to include all horizontal sets of composition lines or all vertical sets of composition lines in an adaptive image armature. In this regard, adaptive image armature generation component 212 of FIG. 2 identifies the horizontal composition line with the highest alignment score and sets each additional horizontal composition line in that horizontal composition line's set to the same score, while setting the alignment score for all other horizontal composition lines to zero. Similarly, adaptive image armature generation component 212 identifies the vertical composition line with the highest alignment score and sets each additional vertical composition line in that vertical composition line's set to the same score, while setting the alignment score for all other vertical composition lines to zero. In this way, adaptive image armature generation component 212 ensures an adaptive image armature includes at most only one set of horizontal composition lines and one set of vertical composition lines.

Example Flow Diagrams

With reference to FIGS. 8, 9, 10 and 11, flow diagrams are provided illustrating methods for providing an adaptive image armature generation engine that supports automatically generating image armatures (e.g., adaptive image armatures) based on adapting or identifying a subset of composition lines from a composition armature template (e.g., reference armature). The methods may be performed using the adaptive image armature generation engine described herein. In embodiments, one or more computer storage media having computer-executable instructions embodied thereon that, when executed, by one or more processors, can cause the one or more processors to perform the methods in the search system.

Figure 8:
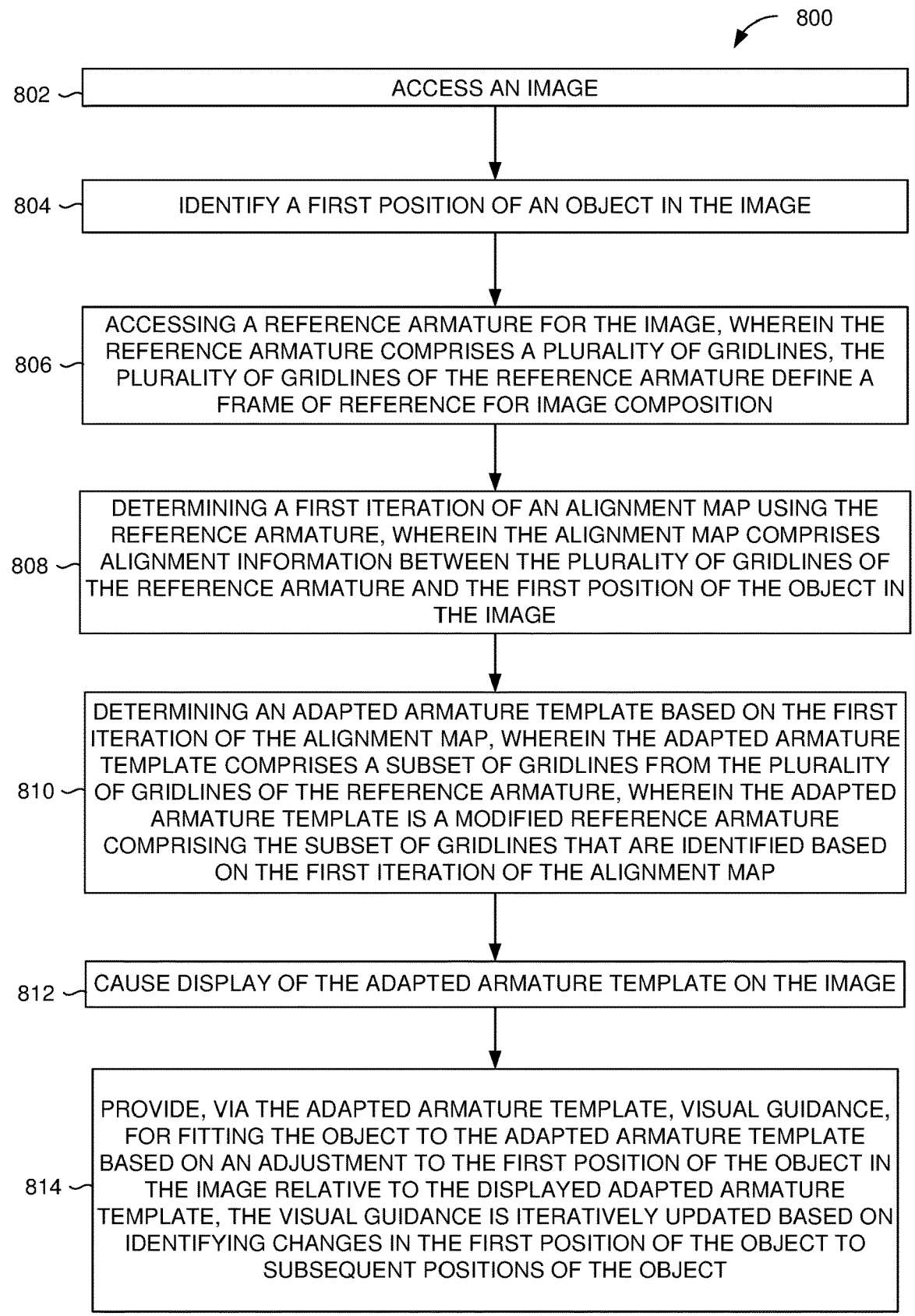
FIG. 8 a flow diagram showing an example method for generating adaptive image armatures, in accordance with embodiments of the present disclosure.

Turning now to FIG. 8, a flow diagram is provided showing an example method 800 for generating adaptive image armatures, in accordance with embodiments of the present disclosure. In embodiments, method 800 is performed by an adaptive image armature generation engine, such as adaptive image armature generation engine 200 of FIG. 2. Initially, and as indicated at block 802, a reference armature for an image is accessed. The reference armature includes a plurality of lines that are a frame of reference for image composition. At block 804, an alignment map is determined using the reference armature. The alignment map includes alignment information that indicates an alignment between the plurality of composition lines of the reference armature and a position of an object in the image. Referring to block 806, an adaptive image armature is determined based on the alignment map. The determined adaptive image armature includes a subset of composition lines from the plurality of composition lines of the reference armature. At block 808, the adaptive armature is displayed on the image. At block 810, visual guidance is provided within the adaptive image armature for fitting the object to the adaptive image armature based on an adjustment to the position of the object in the image relative to the displayed adaptive image armature. The visual guidance can be adaptively (e.g., iteratively, dynamically) updated based on identifying changes in the position of the object to subsequent positions of the object.

Figure 9:
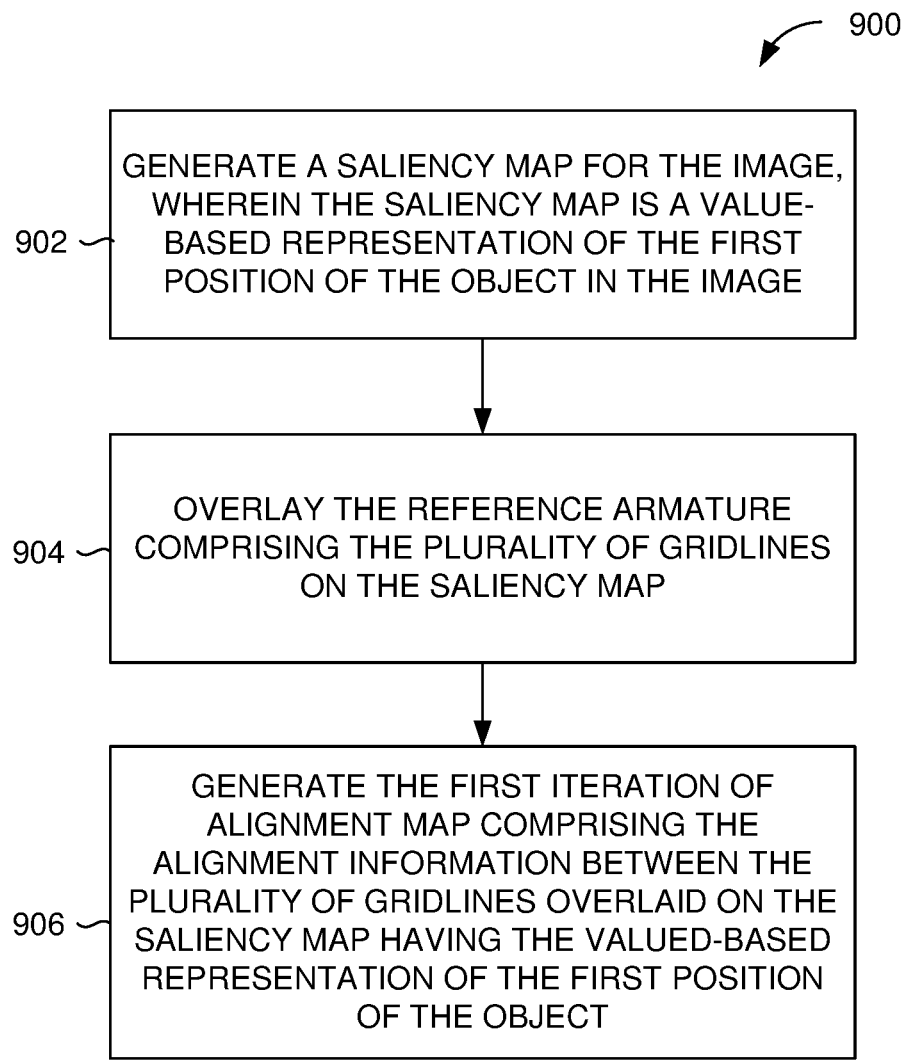
FIG. 9 is a flow diagram showing an example method for determining an alignment map, in accordance embodiments of the present disclosure.
Figure 10:
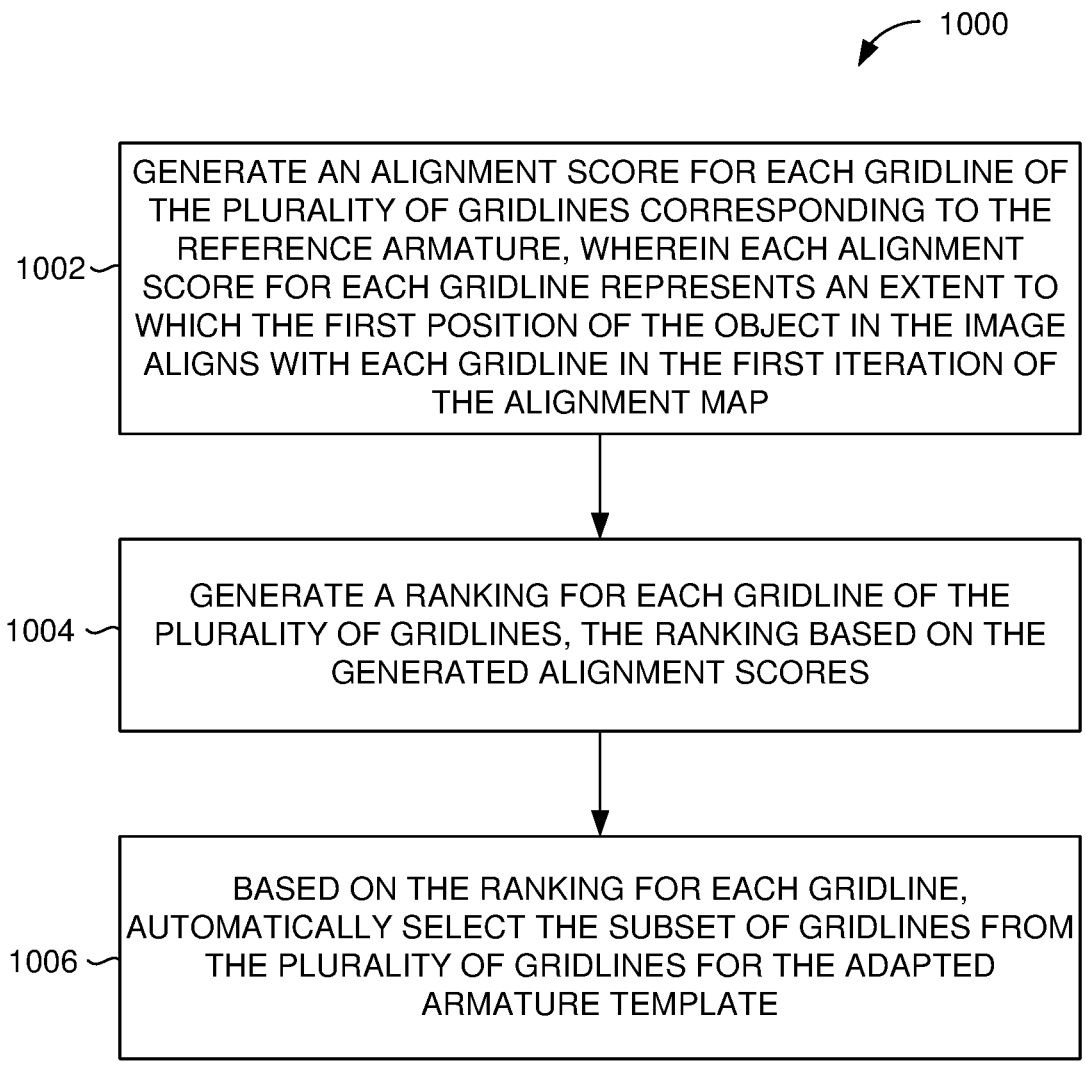
FIG. 10 is a flow diagram showing an example method for determining an adaptive image armature, in accordance with embodiments of the present disclosure.

Turning now to FIG. 9, a flow diagram is provided showing an example method 900 for adaptively determining an alignment map, in accordance with embodiments of the present disclosure. In embodiments, method 900 is performed by an adaptive image armature generation engine, such as adaptive image armature generation engine 200 of FIG. 2. Initially, and as indicated at block 902, a saliency map for an image is generated. The saliency map is a value-based representation of a position of an object in an image. At block 904, composition lines of a reference armature for the image are overlaid on the saliency map. The overlay identifies which of the composition lines included in the reference armature align the position of the object in the image. At block 906, an alignment map is generated. The alignment map includes alignment information indicating alignment between the composition lines overlaid on the saliency map having value-based representation of the positon of the object Turning now to FIG. 10, a flow diagram is provided showing an example method 1000 for automatically selecting an adaptive image armature, in accordance with embodiments of the present disclosure. In embodiments, method 1000 is performed by an adaptive image armature generation engine, such as adaptive image armature generation engine 200 of FIG. 2. Initially, and as indicated at block 1002, an alignment score is generated for each composition line of a reference armature. Each alignment score for each composition line represents an extent to which a positon of an object in an image aligns with each composition line in the reference armature overlaid in an alignment map. As discussed herein, a higher score indicates a composition line is more closely aligned to an object in an image. Referring to block 1004, a ranking is generated for each composition line based on the generated alignment score for each composition line. At block 1006, a subset of composition lines from the composition lines are selected based on the ranking for each composition line. The subset of composition lines selected are included in the adaptive image armature.

Figure 11:
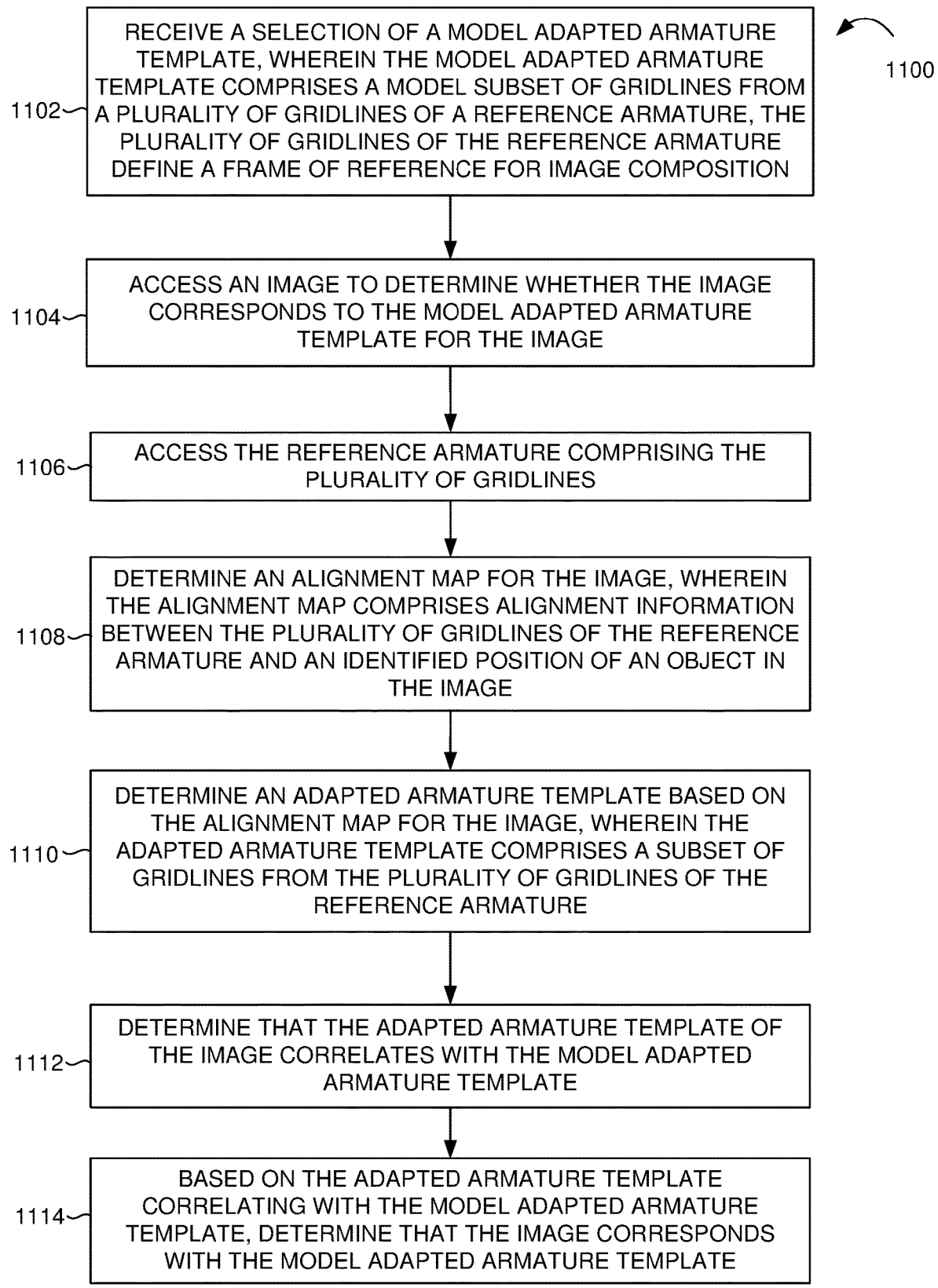
FIG. 11 is a flow diagram showing an example method for querying images based on receiving a selection of a model armature template, in accordance with embodiments of the present disclosure.

Turning now to FIG. 11, a flow diagram is provided showing an example method 1100 for querying images based on receiving a selection of a model armature template, in accordance with embodiments of the present disclosure. In embodiments, method 1100 is performed by an adaptive image armature generation engine, such as adaptive image armature generation engine 200 of FIG. 2. Initially, and as indicated at block 1102, an alignment map for the image is determined. The alignment map comprises alignment information indicating an alignment between a plurality of composition lines of a reference armature and an identified position of an object in the image. The reference armature includes the plurality of composition lines that are a frame of reference for image composition. At block 1104, an adaptive image armature is determined based on the alignment map for the image. The adaptive image armature comprises a subset of composition lines from the plurality of composition lines of the reference armature. Referring now to block 1106, a determination is made that the adaptive image armature of the image correlates with a model armature template. The model armature template includes a model subset of composition lines from the plurality of composition lines of the reference armature. At block 1108, based on the adaptive image armature correlating with the model armature template, a determination is made that the image corresponds with the model armature template.

Exemplary Operating Environment

Figure 12:
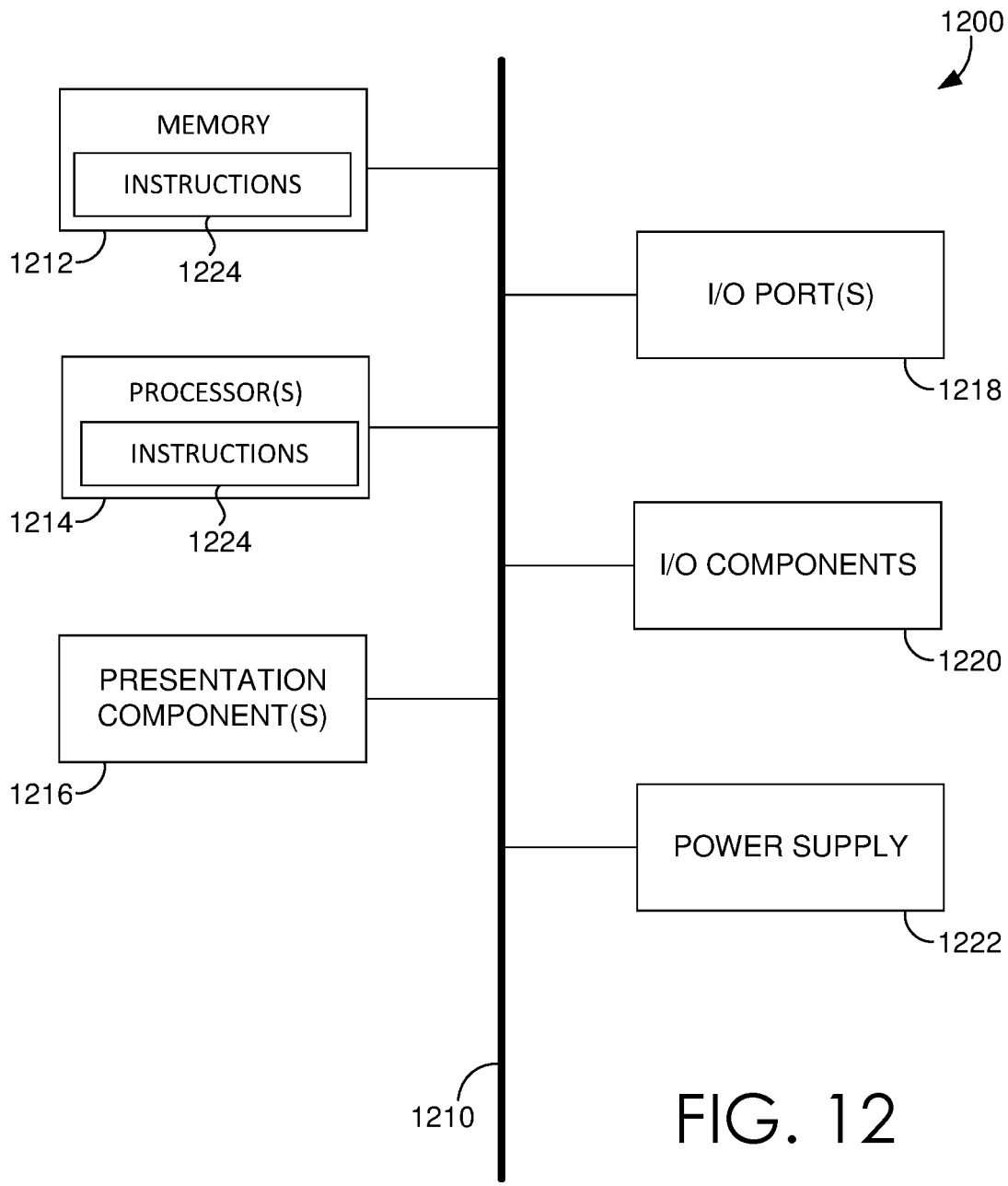
FIG. 12 is a block diagram of an exemplary computing environment suitable for use in implementing embodiments of the present disclosure.

Having described an overview of embodiments of the present invention, an exemplary operating environment in which embodiments of the present invention may be implemented is described below in order to provide a general context for various aspects of the present invention. Referring now to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1200.

Computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of computing device 1200 to render immersive augmented reality or virtual reality.

Embodiments described herein facilitate the automatic generation of adaptive image armatures based on an alignment between objects in an image and a set of composition lines of a reference armature. Components described herein refer to integrated components of adaptive image armature generation system. The integrated components refer to the hardware architecture and software framework that support functionality using the adaptive image armature generation system. The hardware architecture refers to physical components and interrelationships thereof, and the software framework refers to software providing functionality that can be implemented with hardware embodied on a device.

The adaptive image armature generation system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether.

Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for generating adaptive image armatures, the method comprising:
  accessing a reference armature for an image, wherein the reference armature comprises a plurality of composition lines that are a frame of reference for image composition:
  determining an alignment map using the reference armature, wherein the alignment map comprises alignment information indicating an alignment between the plurality of composition lines of the reference armature and a position of an object in the image;
  generating alignment scores for each composition line of the plurality of composition lines corresponding to the reference armature, wherein each alignment score for each composition line represents an extent to which the position of the object in the image aligns with the composition line in the reference armature overlaid on the alignment map;
  determining an adaptive image armature comprising a subset of composition lines selected based on the alignment map and the alignment scores, wherein determining the adaptive image armature comprises automatically selecting the subset of composition lines from the plurality of composition lines of the reference armature, the alignment map and alignment scores support ranking the plurality of composition lines associated with automatically selecting the subset of composition lines; and
  causing display of the adaptive image armature on the image.

2. The method of claim 1, further comprising iteratively accessing a plurality of images having the object in a plurality of subsequent positions, wherein the reference armature is dynamically referenced to generate corresponding adaptive image armatures for the plurality of subsequent positions of the object.

3. The method of claim 1, wherein determining the alignment map comprises:
  generating a saliency map for the image, wherein the saliency map is a value-based representation of the position of the object in the image;
  overlaying the reference armature comprising the plurality of composition lines on the saliency map; and
  generating the alignment map comprising the alignment information indicating the alignment between the plurality of composition lines overlaid on the saliency map having the value-based representation of the position of the object.

4. The method of claim 1, wherein determining the adaptive image armature using the alignment map comprises:
  generating a ranking for each composition line of the plurality of composition lines, the ranking based on the generated alignment scores associated with the alignment map; and
  based on the ranking for each composition line, automatically selecting the subset of composition lines from the plurality of composition lines for the adaptive image armature.

5. The method of claim 1, wherein the adaptive image armature is caused to be displayed with visual guidance for fitting the object to the adaptive image armature based on an adjustment to the position of the object in the image relative to the displayed adaptive image armature.

6. The method of claim 5, wherein the visual guidance is iteratively updated based on identifying changes in the position of the object to subsequent positions of the object.

7. The method of claim 1, further comprising:
  identifying a position change of the position of the object to a subsequent position;
  based on the position change in the position, dynamically generating a subsequent iteration of the alignment map, wherein the subsequent iteration of the alignment map comprises updated alignment information indicating an alignment between the position of composition lines and the subsequent position;
  updating the adaptive image armature, wherein the updated adaptive image armature comprises an updated subset of composition lines from the plurality of composition lines of reference armature; and
  causing display of the updated adaptive image armature on the image.

8. One or more computer storage media storing computer-useable instructions that, when executed by one or more computing devices, causes the one or more computing devices to perform operations, the operations comprising:
  determining an alignment map for an image, wherein the alignment map comprises alignment information indicating an alignment between a plurality of composition lines of a reference armature and an identified position of an object in an image, the reference armature comprises the plurality of composition lines that are a frame of reference for image composition;
  generating alignment scores for each composition line of the plurality of composition lines corresponding to the reference armature, wherein each alignment score for each composition line represents an extent to which the position of the object in the image aligns with the composition line in the reference armature overlaid on the alignment map;
  determining an adaptive image armature comprising a subset of composition lines selected based on the alignment map for the image and the alignment scores, wherein determining the adaptive image armature comprises automatically selecting the subset of composition lines from the plurality of composition lines of the reference armature, the alignment map and alignment scores support ranking the plurality of composition lines associated with automatically selecting the subset of composition lines; and determining that the adaptive image armature of the image correlates with a model armature template, wherein the model armature template comprises a model subset of composition lines from the plurality of composition lines of the reference armature; and based on the adaptive image armature correlating with the model armature template, determining that the image corresponds with the model armature template.

9. The one or more computer storage media of claim 8, wherein determining the alignment map for the image comprises:

generating a saliency map for the image, wherein the saliency map is a value-based representation of the identified position of the object in the image;

overlaying the reference armature comprising the plurality of composition lines of the saliency map; and generating the alignment map for the image comprising the alignment information indicating the alignment between the plurality of composition lines overlaid on the saliency map having the value-based representation of the identified position of the object.

10. The one or more computer storage media of claim 8, wherein determining the adaptive image armature using the alignment map comprises:

generating a ranking for each composition line of the plurality of composition lines, the ranking based on the generated alignment scores associated with the alignment map; and based on the ranking for each composition line, automatically selecting the subset of composition lines from the plurality of composition lines for adaptive image armature.

11. The one or more computer storage media of claim 8, wherein the adaptive image armature is caused to be displayed with visual guidance for fitting the object to the adaptive image armature based on an adjustment to the identified position of the object in the image relative to the adaptive image armature.

12. The one or more computer storage media of claim 11, wherein the visual guidance is iteratively updated based on identifying changes in the identified position of the object to subsequent positions of the object.

13. The one or more computer storage media of claim 8, further comprising:

in response to receiving a selection of a composition-style, the composition-style including at least two model armature templates, identifying at least one image in a plurality of images whose composition matches one of the at least two model armature templates; and causing the display of the matching adaptive image armature on the at least one image whose composition matches either of the at least two model armature templates.

14. A system for utilizing adaptive image armatures, the system comprising:

one or more processors; and one or more computer storage media storing computer-useable instructions that, when used by one or more processors, cause the one or more processors to execute:

means for accessing a reference armature for an image, wherein the reference armature comprises a plurality of composition lines that are a frame of reference of image composition;

means for determining an alignment map using the reference armature, wherein the alignment map comprises alignment information indicating an alignment between the plurality of composition lines of the reference armature and a position of the object in the image;

means for generating alignment scores for each composition line of the plurality of composition lines corresponding to the reference armature, wherein each alignment score for each composition line represents an extent to which the position of the object in the image aligns with the composition line in the reference armature overlaid on the alignment map;

means for determining an adaptive image armature comprising a subset of composition lines selected based on the alignment map and the alignment scores, wherein determining the adaptive image armature comprises automatically selecting the subset of composition lines from the plurality of composition lines of the reference armature, the alignment map and alignment scores that support ranking the plurality of composition lines associated with automatically selecting the subset of composition lines; and means for causing display of the adaptive image armature on the image.

15. The system of claim 14, further comprising:

means for determining an alignment map for a stored image, wherein the alignment map for the stored image comprises alignment information indicating an alignment between the plurality of composition lines of the reference armature and an identified position of an identified object in the stored image;

means for determining an adaptive armature for the stored image based on the alignment map for the stored image, wherein the adaptive image armature for the stored image comprises a second subset of composition lines from the plurality of composition lines of the reference armature;

means for determining that the adaptive image armature for the stored image correlates with a model armature template, wherein the model armature template comprises a model subset of composition lines from the plurality of composition lines of the reference armature; and means on the adaptive image armature for the stored image correlating with the model armature template, determining that the stored image corresponds with the model armature template.

16. The system of claim 15, wherein, in response to receiving a selection of a composition-style, the composition-style including at least two model armature templates, identifying at least one image in a plurality of images whose composition matches one of the at least two model armature templates; and causing display of the matching adaptive image armature on the at least one image whose composition matches either of the at least two model armature templates.

17. The system of claim 14, wherein determining the alignment map comprises:

generating a saliency map for the image, wherein the saliency map is a value-based on representation of the position of the object in the image;

overlaying the reference armature comprising the plurality of composition lines on the saliency map; and generating the alignment map comprising the alignment information indicating alignment between the plurality of composition lines overlaid on the saliency map having the value-based representation of the position of the object.

18. The system of claim 14, wherein determining the adaptive image armature using the alignment map comprises:
- generating a ranking for each composition line of the plurality of composition lines, the ranking based on the generated alignment scores associated with the alignment map; and
- based on the ranking for each composition lines, automatically selecting the subset of composition lines from the plurality of composition lines for the adaptive image armature.

19. The system of claim 14, wherein the adaptive image armature is caused to be displayed with visual guidance for fitting the object to the adaptive image armature based on an adjustment to the position of the object in the image relative to the displayed adaptive image armature.

20. The system of claim 19, wherein the visual guidance is iteratively updated based on the identifying changes in the position of the object to subsequent positions of the object.

* * * * *